US011393019B2

(12) United States Patent
Hirano et al.

(10) Patent No.: US 11,393,019 B2
(45) Date of Patent: Jul. 19, 2022

(54) DEVICE AND METHOD FOR EXCHANGING TRADE INFORMATION

(71) Applicants:National institute of Advanced industrial Science and Technology, Tokyo (JP); Peace and Passion Inc., Tsukuba (JP)

(72) Inventors: Satoshi Hirano, Ibaraki (JP); Nuttapong Attrapadung, Tokyo (JP); Senlin Guan, Ibaraki (JP)

(73) Assignees: NATIONAL INSTITUTE OF ADVANCED INDUSTRIAL SCIENCE AND TECHNOLOGY, Tokyo (JP); PEACE AND PASSION INC., Ibaraki (JP)

( * ) Notice: Subject to any disclaimer, the term of this patent is extended or adjusted under 35 U.S.C. 154(b) by 570 days.

(21) Appl. No.: 15/310,650

(22) PCT Filed: Mar. 31, 2015

(86) PCT No.: PCT/JP2015/060208
§ 371 (c)(1),
(2) Date: Feb. 3, 2017

(87) PCT Pub. No.: WO2015/174157
PCT Pub. Date: Nov. 19, 2015

(65) Prior Publication Data
US 2017/0140459 A1  May 18, 2017

(30) Foreign Application Priority Data

May 14, 2014 (JP) .............................. JP2014-100167
Jun. 4, 2014 (JP) .............................. JP2014-115840

(51) Int. Cl.
*G06Q 30/06* (2012.01)
*G06Q 30/08* (2012.01)
*G06Q 20/12* (2012.01)

(52) U.S. Cl.
CPC ............. *G06Q 30/08* (2013.01); *G06Q 20/12* (2013.01); *G06Q 30/0635* (2013.01)

(58) Field of Classification Search
CPC ..... G06Q 30/06; G06Q 30/0601–0643; G06Q 30/08; G06Q 30/02–0202
See application file for complete search history.

(56) References Cited

U.S. PATENT DOCUMENTS 8,364,541 B2  1/2013 Roth
2005/0027641 A1*  2/2005  Grove .................... G06Q 30/02
705/37

(Continued)

FOREIGN PATENT DOCUMENTS

CN  102346893 A  2/2012
CN  102609870 A  7/2012

(Continued)

OTHER PUBLICATIONS

Multi-Round Anonymous Auction Protocols. Hiroaki Kikuchi, Michael Hakavy, and Doug Tygar. In Institute of Electronics, Information, and Communication Engineers Transactions on Information and Systems, E82-D:4, Apr. 1999, pp. 769-777 (Year: 1999).*

(Continued)

*Primary Examiner* — William J Allen
(74) *Attorney, Agent, or Firm* — Muncy, Geissler, Olds & Lowe, P.C.

(57) ABSTRACT

Purchase from sellers of selection is enabled to be made through simple operations. Furthermore, prospective purchase events are distributed to sellers as needed. Demands of purchase candidates are retrieved.

(Continued)

A trade information exchange method for achieving information exchange among multiple computers included in an information communication network: causes memory means to store reception conditions of sellers received from computers of the sellers; causes the memory means to store request information received from a computer of a purchaser; makes a first selection of choosing one or more sellers having reception conditions that conform to the request information; transmits the request information that does not include purchaser contact information to the computers of the sellers selected in the first selection, subsequently receives information indicating bids, makes a second selection of choosing one or more sellers according to the bids among limited sellers offering bids that can be successfully charged; and permits communication between the computers of the sellers selected in the second selection and the computer of the purchaser.

1 Claim, 25 Drawing Sheets

(56) References Cited

U.S. PATENT DOCUMENTS

| | | | |
|---|---|---|---|
| 2008/0162330 A1* | 7/2008 | Atkinson | G06Q 30/0601 |
| | | | 705/37 |
| 2009/0125415 A1* | 5/2009 | Gindlesperger | G06Q 10/087 |
| | | | 705/26.1 |
| 2013/0010103 A1 | 1/2013 | Ihara et al. | |
| 2013/0024297 A1 | 1/2013 | Lee et al. | |
| 2014/0210853 A1 | 7/2014 | Sasao et al. | |
| 2014/0210859 A1 | 7/2014 | Ihara et al. | |
| 2014/0214606 A1 | 7/2014 | Ihara et al. | |
| 2014/0229353 A1* | 8/2014 | Lutnick | G06Q 40/04 |
| | | | 705/37 |
| 2014/0316940 A1* | 10/2014 | Kirchenbauer | G06Q 30/0609 |
| | | | 705/26.35 |
| 2015/0142674 A1* | 5/2015 | Silberberg | G06Q 30/0611 |
| | | | 705/80 |

FOREIGN PATENT DOCUMENTS

| | | |
|---|---|---|
| JP | 2002-092411 | 3/2002 |
| JP | 2002-215766 | 8/2002 |
| JP | 2002329131 A | 11/2002 |
| JP | 2003-006511 | 1/2003 |
| JP | 2003-067654 | 3/2003 |
| JP | 2003331188 A | 11/2003 |
| JP | 2004-171360 | 6/2004 |
| JP | 2004-295267 | 10/2004 |
| JP | 2006-031200 | 2/2006 |
| JP | 2007-257270 | 10/2007 |
| JP | 2008-003860 | 1/2008 |
| JP | 2008-181284 | 8/2008 |
| JP | 2008-243118 | 10/2008 |
| JP | 5116116 | 1/2010 |
| JP | 2010-102599 | 5/2010 |
| JP | 2012053659 A | 3/2012 |
| JP | 2012-155504 | 8/2012 |
| JP | 2013-501294 | 1/2013 |
| JP | 2013-077328 | 4/2013 |
| JP | 2013-250700 | 12/2013 |
| WO | WO-2010127677 A1 | 11/2010 |
| WO | WO-2011059846 A1 | 5/2011 |
| WO | WO-2011059846 A8 | 5/2011 |
| WO | 2013-145499 | 10/2013 |

OTHER PUBLICATIONS

International Search Report dated Jun. 30, 2015 for PCT/JP2015/060208.
Paul Milgrom,, 1st ed., Toyo Keizai Inc., Nov. 2007, pp. 11-58.
Google shopping_onling_internet.
Amazon Dash_online_internet.
Office Action dated Apr. 3, 2019 from CN Application No. 201580025176.5.

* cited by examiner

DEVICE AND METHOD FOR EXCHANGING TRADE INFORMATION

TECHNICAL FIELD

The present invention relates to an information communication technology for performing trade.

BACKGROUND ART

In this Description, articles represent all objects of trade that include goods and services. Sale represents article selling and service providing. Purchase of articles represents purchase of articles and services. A purchaser represents a person or an organization that has a possibility of potentially purchasing articles, and a person or an organization that is performing purchase. A seller represents an organization, such as a person, shop or company, that sells articles. Purchase information indicates an estimate of a purchase amount, advertisement, a discount coupon and the like. Purchaser identification information is information that specifies and identifies a purchaser, and may be an address, a name, a user ID, an email address or the like.

Conventionally, various information exchange systems for supporting trade between purchasers and sellers of articles have been invented. The following Patent Literatures 1 and 2 disclose techniques that match wishes of purchasers and sellers using an information technology and notifies matching parties of the result.

Competitive tendering (auction) is a method of allowing sellers without the connections or achievements to participate fairly in the market. In research fields of the game theory and market design, tendering has been recognized as a social infrastructural method that improves social fairness and efficiency, and researches and implementation have been advanced. Among tendering schemes that do not disclose the highest price in bidding, a scheme of paying a second-highest price referred to as second price auction is typically implemented in current search advertising, as shown in Non Patent Literature 1.

The "combinatorial auction" of tendering for a combination of multiple articles has been researched. One type thereof is a VCG action. It has been proved that there is no method of completely prevent a single person from using multiple fictitious names to make multiple bids.

Non Patent Literature 2 describes a service that is on a network and uses tendering to incorporate article prices into results of searches performed by purchasers. Although the names and quantities of multiple articles are input into a search window, no estimate of the total amount is displayed and no means for price negotiation is provided.

Patent Literature 3 discloses the Real-Time Bidding (RTB) advertising technology. When this technology determines to provide viewers with advertisements held by multiple bidding agents before displaying webpages, the technology transmits bids to a server, causes the server to choose only one bid having the highest price and displays an advertisement provided by the selected agent on the page. An opportunity of viewing the webpage is at input. Input of the name of any article by the reader is not regarded as a target. The output to the viewer is only one advertisement.

Non Patent Literature 3 describes a small device for supporting purchase of articles. The device transmits, to a server, a speech such as of "cabbage" made by a purchaser, thereby adding the name of the article to a shopping cart on a website.

CITATION LIST

Patent Literature

Patent Literature 1: Japanese Patent Laid-Open No. 2012-155504
Patent Literature 2: Japanese Patent No. 5116116
Patent Literature 3: U.S. Pat. No. 8,364,541

Non Patent Literature

Non Patent Literature 1: Paul Milgrom, "Putting Auction Theory to Work", 1st ed., Toyo Keizai Inc., November 2007, pp. 11-58
Non Patent Literature 2: Google, "Google Shopping", [online], Mar. 31, 2012, Google, [retrieved on Apr. 23, 2014], Internet <URL:https://www.google.com/shopping>
Non Patent Literature 3: Amazon®, "Amazon® Dash", [online], Apr. 4, 2014, Amazon®, [retrieved on Apr. 23, 2014], Internet <URL:https://fresh.amazon.com/dash/>

SUMMARY OF INVENTION

Technical Problem

The present invention has a main object to provide a trade information exchange method and device according to which images of desired articles are taken through a smartphone or the like, and when desired articles are on TV, a button of a remote control is pressed or the specifications of desired articles are input as a text or speech such as of "two XXs and three YYs with installation services and guidance, please", thereby allowing reception of estimates and discount coupons from multiple sellers and then choosing a preferred seller to purchase the article.

The present invention also has another main object to provide sellers with a trade information exchange method and device that can distribute prospective purchase events as needed more efficiently than advertisement, retrieve purchase candidates, and transmit campaign information to the purchase candidate.

Improvement in information communication technology has achieved widespread use of shopping sites, price comparison sites, auctions (bidding up), reverse auctions (bidding down), crowdsourcing (work commission on a network).

Conventionally, when a purchaser wishes to purchase multiple articles and services at the same time, he or she is required to survey prices and delivery charges on price comparison sites and shopping sites, and calculate a combination of shopping sites achieving the lowest price using spreadsheet software, thus requiring time and efforts.

In particular, careful price survey is difficult through a small screen of a smartphone. There is no method of easily recognizing prices including services for installation and guidance. In purchase of articles and services, careful comparison of prices on any article and service is not always necessarily required.

The price comparison site displays prices of one article, and does not provide prices in a case of combined purchase of multiple articles. Use of a shopping cart in a shop on a shopping site provides the prices of multiple articles but provides only the prices in the same shop. When an inquiry about a price is made to a shop using email or telephone, only the price in the same shop is provided. Accordingly, estimates are required to be requested multiple times.

On the other hand, sellers operating shops and shopping sites have objects of business to set sales targets and sell articles to people as many as possible at prices as high as possible. Conventionally, it is typical that sellers put many advertisements to attract purchasers, and wait until purchasers visit shops and web sites and put articles into carts. However, advertisements are presented and displayed even for people that are uninterested in shopping of articles that sellers wish to sell. Consequently, the efficiencies of advertisement fees are low.

It is easy for operators of price comparison sites to calculate the most inexpensive combination of articles that purchasers want. However, sellers often gain profits by selling bargain articles to be sold to attract customers' attention while selling articles for impulse buys. The sellers wish to obtain purchasers that collectively buy multiple articles.

A significantly large number of sellers over the entire country can participate in price comparison sites and crowdsourcing. Consequently, it is required to present prices that are most inexpensive over the entire country to obtain orders. Individual sellers behave so as to lower the selling cost below other sellers, such as purchasing prices and labor costs. Consequently, the behavior is one factor of deflation that is continuous reduction in prices of articles and continuous reduction in wage level of workers in the macro-economic view.

It is good for purchasers to buy at low prices in a short-term view. However, in a long-term view, the wage level is decreasing as described above, which causes a problem of reducing the disposable income.

Furthermore, while the sales in huge shopping sites with a wide assortment of articles are significantly increasing, there are problems in that local small shops go bankrupt and customers cannot buy articles immediately at the time of need at local places to thus cause difficulties for the customers, local economies collapse, and income disparity increases. Occasions of distribution from remote places increase, which in turn increases the amount of $CO_2$ emission and advances global-warming.

To solve the problems, a trade information exchange method "H marketing" that balance both parties, i.e., purchasers that wish to buy inexpensive articles and sellers that wish to sell the articles at high prices, and achieve higher convenience, and a new market economy mechanism "H economy" that can adjust prices.

Solution to Problem

To solve the above problems, the present invention provides a trade information exchange device for achieving information exchange between multiple computers that constitute an information communication network and are connected to the device, including: memory means for storing a reception condition and request information; charging means for including an account of each charge object, and charging and recording the account; and data processing means for causing the memory means to store the reception condition of a seller received from the computer of the seller, causing the memory means to store the request information received from the computer of a purchaser, performing a first selection that chooses one or more sellers whose reception conditions of the sellers conform to the request information, transmitting the request information that does not include purchaser contact information to the computer of the selected seller, subsequently receiving information indicating a bid, and performing a second selection that chooses one or more sellers according to the bids from among limited sellers on which the bid can be successfully charged by the charging means, and permitting communication between the computer of the seller selected by the second selection and the computer of the conforming seller.

To solve the above problems, the present invention provides a trade information exchange device for achieving information exchange between multiple computers that constitute an information communication network and are connected to the device, including: memory means for storing a reception condition and transmission data; charging means for including an account of each charge object, and charging and recording the account; and data processing means for causing the memory means to store the purchaser's receive terms received from the computer of the purchaser, and the transmission data received from the computer of the seller, performing a first selection that chooses one or more sellers whose transmission data conforms to the purchaser's receive terms, transmitting the purchaser's receive terms that does not include purchaser contact information to the computer of the selected seller, subsequently receiving information indicating a bid, and performing a second selection that chooses one or more sellers according to the bids from among limited sellers on which the bid can be successfully charged by the charging means, and permitting communication between the computer of the seller selected by the second selection and the computer of the conforming seller.

To solve the above problems, the present invention provides a shopping processing device that is connected to multiple computers including the trade information exchange device via the information communication network, including: memory means for displaying posted information for a viewer who is an affiliate, accepting identification information on an article that is an advertisement target and an input of a character string or an image corresponding to the article, and storing what is accepted; and purchase means for displaying the stored character string or image when the purchaser views the posted information, and transmits the article identification information as the request information or the purchaser's receive terms to the trade information exchange device when the purchaser chooses the character string or the image.

To solve the above problems, the present invention provides a shopping device for achieving purchase by multiple computers that constitute an information communication network and connected to the device, including: settlement means for performing a settlement process for a purchase amount of a purchase target or a settlement information transmission process; and purchase means for transmitting, to one or more computers of the sellers, information including any of a character, an alternative, speech or an image input by the purchaser into the computer, receiving purchase amount from the computer of the seller, and causing the settlement means to perform the purchase amount settlement process or causing the computer of the seller to transmit an intention for purchase received from the purchaser.

To solve the above problems, the present invention provides a trade information exchange method for achieving information exchange among multiple computers included in an information communication network, the method including: a step of causing memory means to store reception conditions of sellers received from computers of the sellers; a step of causing the memory means to store request information received from a computer of a purchaser; a step of making a first selection of choosing one or more sellers having reception conditions that conform to the request information; a step of transmitting the request information that does not include purchaser contact information to the computers of the sellers selected in the first selection, subsequently receives information indicating bids, makes a second selection of choosing one or more sellers according to the bids among limited sellers offering bids that can be successfully charged; and a step of permitting communication between the computers of the sellers selected in the second selection and the computer of the purchaser.

To solve the above problems, the present invention provides a trade information exchange method for achieving information exchange among multiple computers included in an information communication network, the method including: a step of causing data processing means to cause memory means to store a reception condition of a purchaser received from the computer of the purchaser; a step of causing the data processing means to receive transmission data from the computer of a seller and cause the memory means to store the data; a step of performing a first selection that chooses one or more sellers where the transmission data conforms to the purchaser's receive terms; and a step of causing the data processing means to transmit the purchaser's receive terms that does not include purchaser contact information to the computer of the selected seller, subsequently receive information indicating a bid; and perform a second selection that chooses one or more sellers according to the bid from among limited sellers on which the bid can be successfully charged by charging means.

To solve the above problems, the present invention provides a shopping processing method for shopping on computers constituting an information communication network, the method including: a step of casing purchase means to display posted information for a viewer who is an affiliate; a step of causing the purchase means to accept, from the affiliate, identification information on an article on which an advertisement is performed, and an input of a character string or an image corresponding to the article, and causing the memory means to store what is accepted; a step of causing the purchase means to display a stored character string or image, when the purchaser views the posted information; a step of causing the purchase means to accept selection of the character string or the image by the purchaser; and a step of causing the purchase means to transmit, to the trade information exchange device, the article identification information corresponding to the selected character string or image, as request information or the purchaser's receive terms.

To solve the above problems, the present invention provides a shopping method of achieving shopping through computers constituting an information communication network, including: a step of causing purchase means to transmit information including any of a character, an alternative, speech or an image input by a purchaser, to one or more computers of sellers; a step of causing the purchase means to receive information indicating a purchase amount from the computer of the seller; a step of causing the purchase means to cause settlement means for performing a purchase amount settlement process to perform settlement of the purchase amount, or transmit information indicating an intention for purchase received from the purchaser to the computer of the seller.

Advantageous Effects of Invention

The present invention can achieve more effective trade information exchange between computer users who serve as sellers and buyers.

The purchaser takes images of a desired article through a smartphone, presses a button of a remote control during viewing television, or inputs specifications of the desired article through speech, thereby enabling multiple estimates to be obtained and allowing purchaser from a preferable seller. Furthermore, a purchase condition such as "shop with stocks, and you can go and buy it now" can be added. Even through a small screen of a smartphone, the price can be easily researched. Combination of multiple sellers allows shopping at the most inexpensive purchase amount, and one-time shopping along multiple shops in consideration of position information.

The seller can enjoy an advantageous effect that transmission of the names of articles wished to be sold, the selling condition such as "delivery, installation, and guidance available", and the bid to this device, thereby enabling a prospective purchase event to be received at any time to achieve effective selling activities. Furthermore, the sellers can search a purchaser wishes to purchase articles are searchable. Consequently, business proposals can be actively made.

According to present invention, a favorable condition is required to be presented only among a limited number of sellers. Consequently, excessive discount competitions can be avoided. In comparison with a price comparison site, for example, a seller in a local type shop selling with services covering installation and guidance can present a selling amount including an appropriate service price in a case where an elder purchaser designates a condition with an installation service. Even if the purchaser has no knowledge for purchasing an appropriate article, rough matching of keywords can achieve a proposal which is considered to be appropriate through the experience of the seller.

In comparison with search advertisement and content advertisement, the present invention is appropriate for proposals for people having intentions of purchase, and is expected to achieve high advertisement costs.

There are advantageous effects that many general readers of bulletin board and the like can effectively create written text including purchase keywords, receive an affiliate reward, and many readers reading the text can easily purchase an article of the topic only by choosing the written text. Advertisement spaces, or affiliate banners or links are not required to be provided on a screen. Consequently, the screen becomes neat and beautiful.

Furthermore, for a purchaser wishing to buy multiple articles, sellers having a narrow assortment of articles and incapable of solely, comprehensively providing all the articles cooperate with each other to prepare the entire articles, thus providing competitive means against a large-scale shop. There is an advantageous effect of activating local small-scale shops.

DESCRIPTION OF EMBODIMENTS

Hereinafter, computers include program-embedded computing devices that have a function of processing information, and include a personal computer, a server computer, a cloud computer, a cluster computer, a quantum computer, a bio-computer, a smartphone, a tablet, a computer to be embedded, a wearable computer, a mobile terminal, a telephone, a music player, a game machine, a television, a moving image recorder, a camera, a remote control, a vehicle, a robot, and a cyborg, and are embedded with a web browser and programs. A network represents wireless or wired information communication network.

Figure 1:
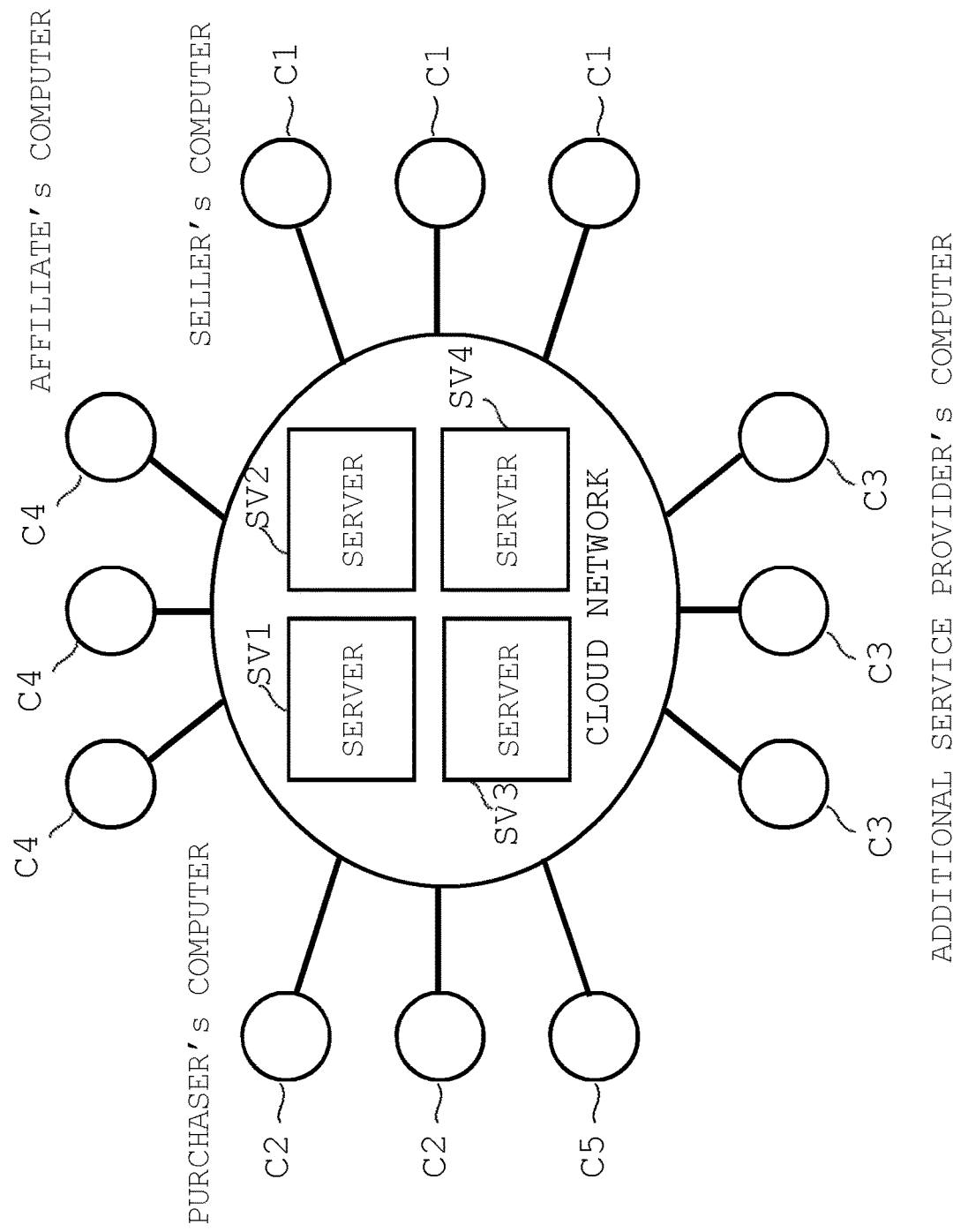
FIG. 1 is a diagram showing a configuration of an information communication network according to an embodiment of the present invention.

FIG. 1 is a diagram showing a configuration of a network according to an embodiment of the present invention. As shown in FIG. 1, a group of servers SV1 to SV4 serving as a trade information exchange device, an advertisement information processing device, a shopping processing device, and a tendering device are connected to each other by a network. The group of servers SV1 to SV4 are connected with a computer C1 of a seller, a computer 2 of a purchaser, a computer C3 of an additional service provider, a computer C4 of an affiliate. Note that in a case without misunderstanding, the representation of the purchaser C1 sometimes indicates the computer C1 of the purchaser.

FIG. 1 shows the network including the four servers SV1 to SV4. However, the servers serving as the trade information exchange device, the advertisement information processing device, the advertisement information processing device, the shopping processing device, and the tendering device may each include one or more servers or an indefinite number of servers as a cloud. Communication in the network is performed according to HTTP or another protocol. The servers SV1 to SV4 may be web servers or servers with other protocols. The places are any places, and may be the inside of a company, the outside of the company, or in a datacenter.

Figure 2:
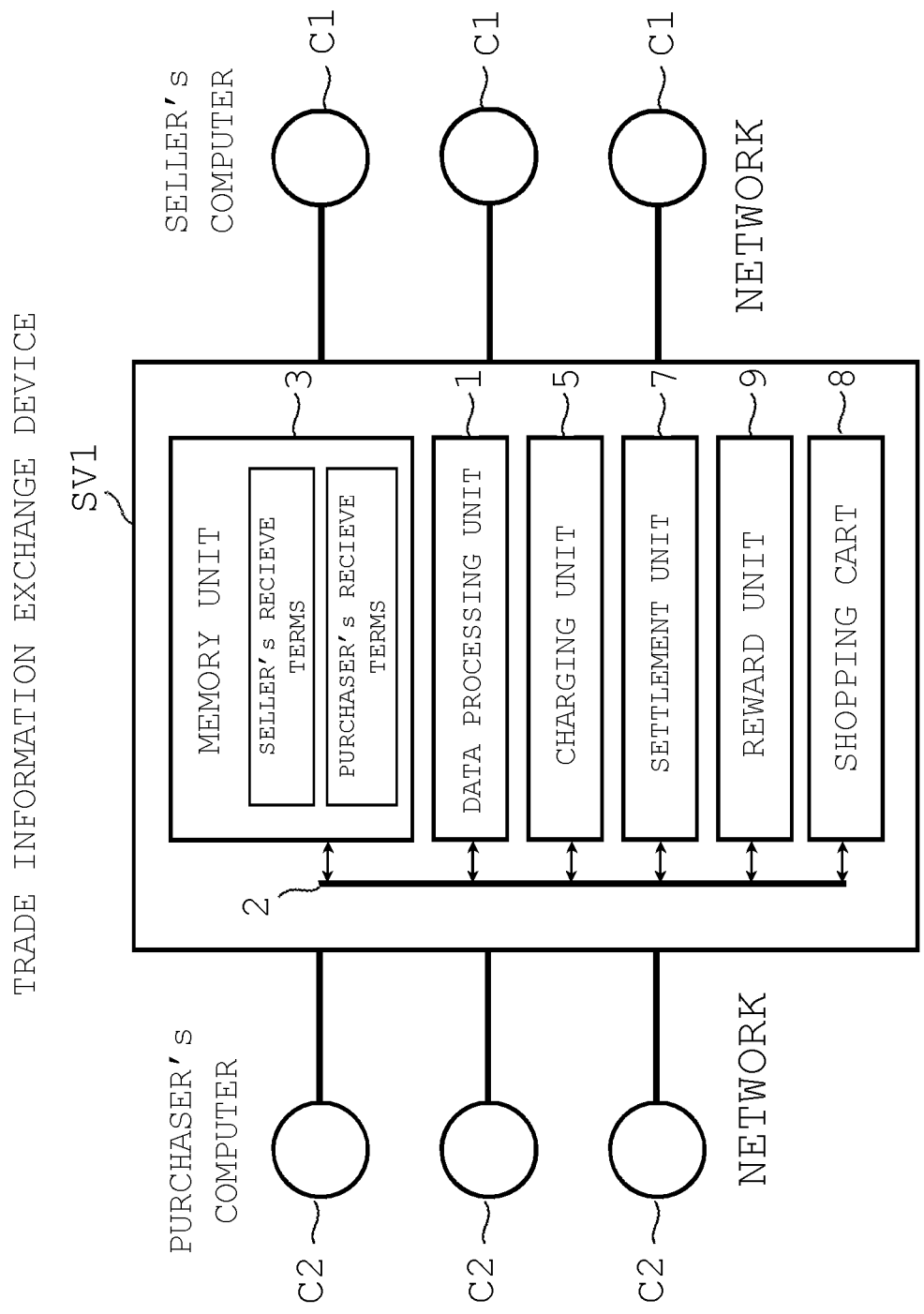
FIG. 2 is a block diagram showing a configuration of a trade information exchange device SV1.

FIG. 2 is a block diagram showing a configuration of a trade information exchange device SV1. As shown in FIG. 2, the trade information exchange device SV1 includes: a bus 2; a data processing unit 1, a storing unit 3, a charging unit 5, a settlement unit 7, a shopping cart 8, and a reward unit 9, which are connected to the bus 2. This device is connected via the network to the computer C1 of the seller, the computer C2 of the purchaser and the like.

Figure 3:
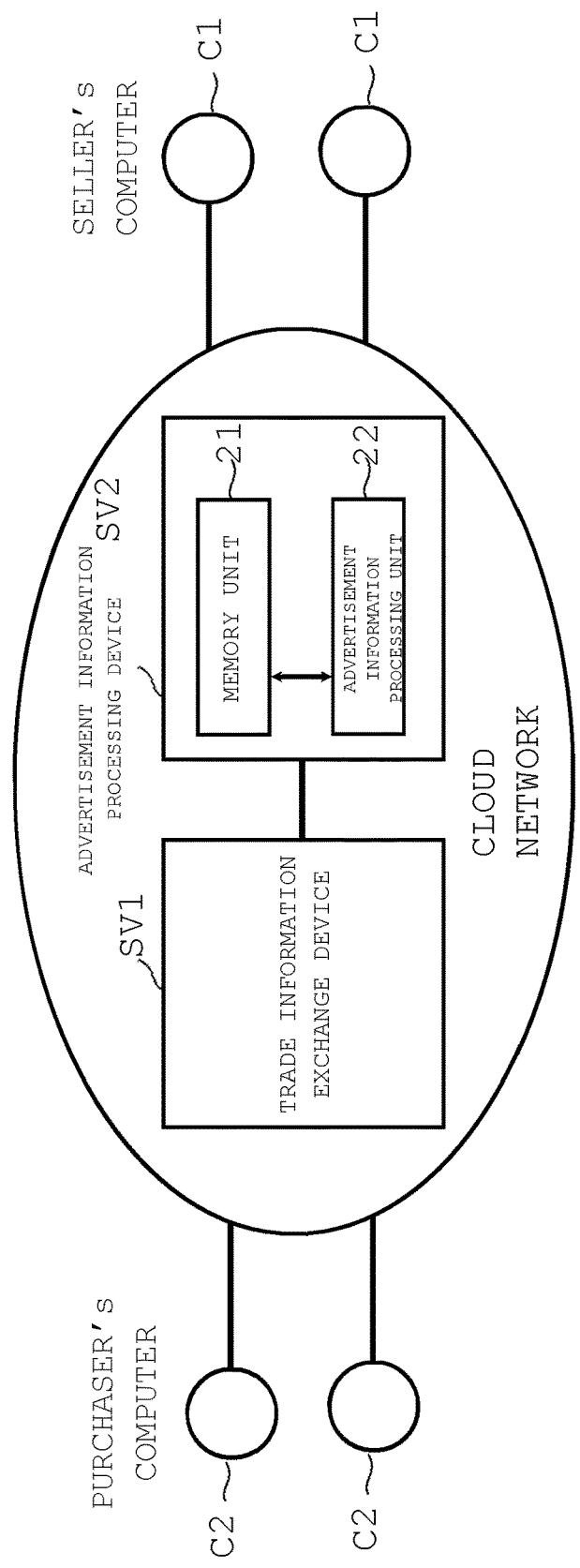
FIG. 3 is a block diagram showing a configuration of an advertisement information processing device SV2.

FIG. 3 is a block diagram showing the configuration of the advertisement information processing device SV2 according to an embodiment of the present invention. As shown in FIG. 3, the advertisement information processing device SV2 includes a storing unit 21 and an advertisement information processing unit 22 which are connected to each other, and is connected to the trade information exchange device SV1 via the network or a bus.

Figure 4:
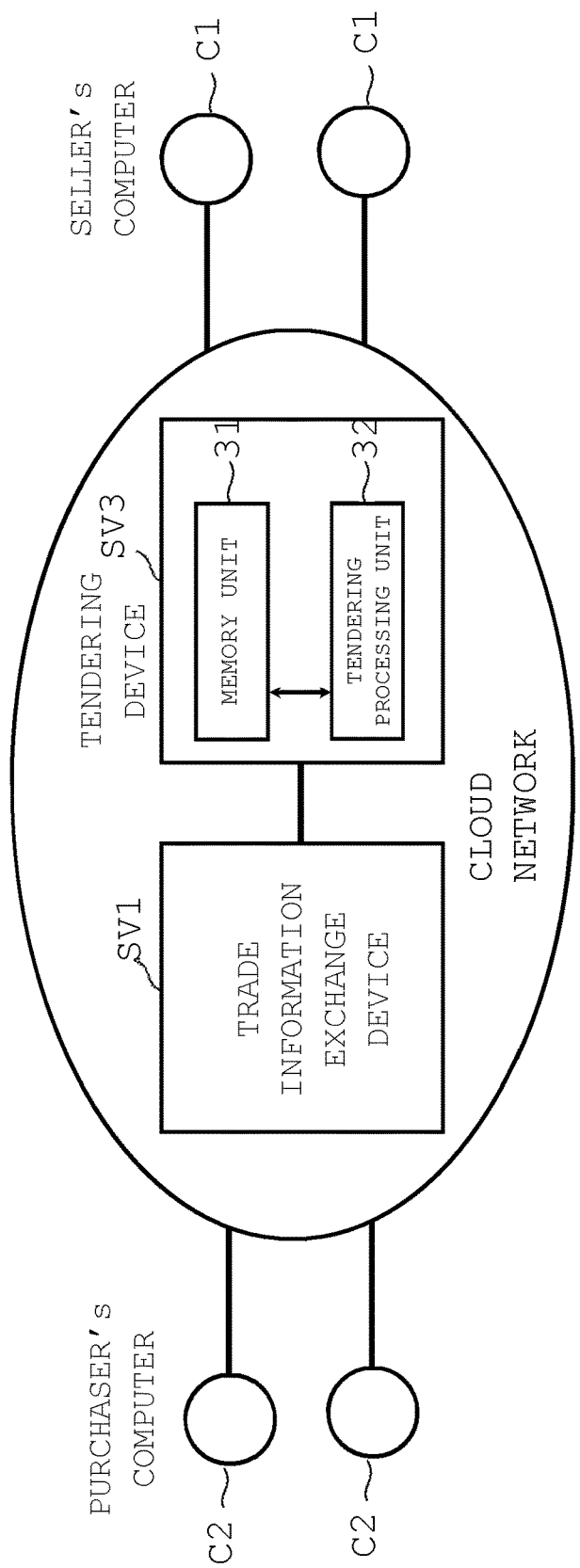
FIG. 4 is a block diagram showing a configuration of a tendering device SV3.

FIG. 4 is a block diagram showing the configuration of the tendering device SV3 according to an embodiment of the present invention. As shown in FIG. 4, the tendering device SV3 includes a storing unit 31 and a tendering unit 32, and is connected to the trade information exchange device SV1 via the network or a bus.

Figure 5:
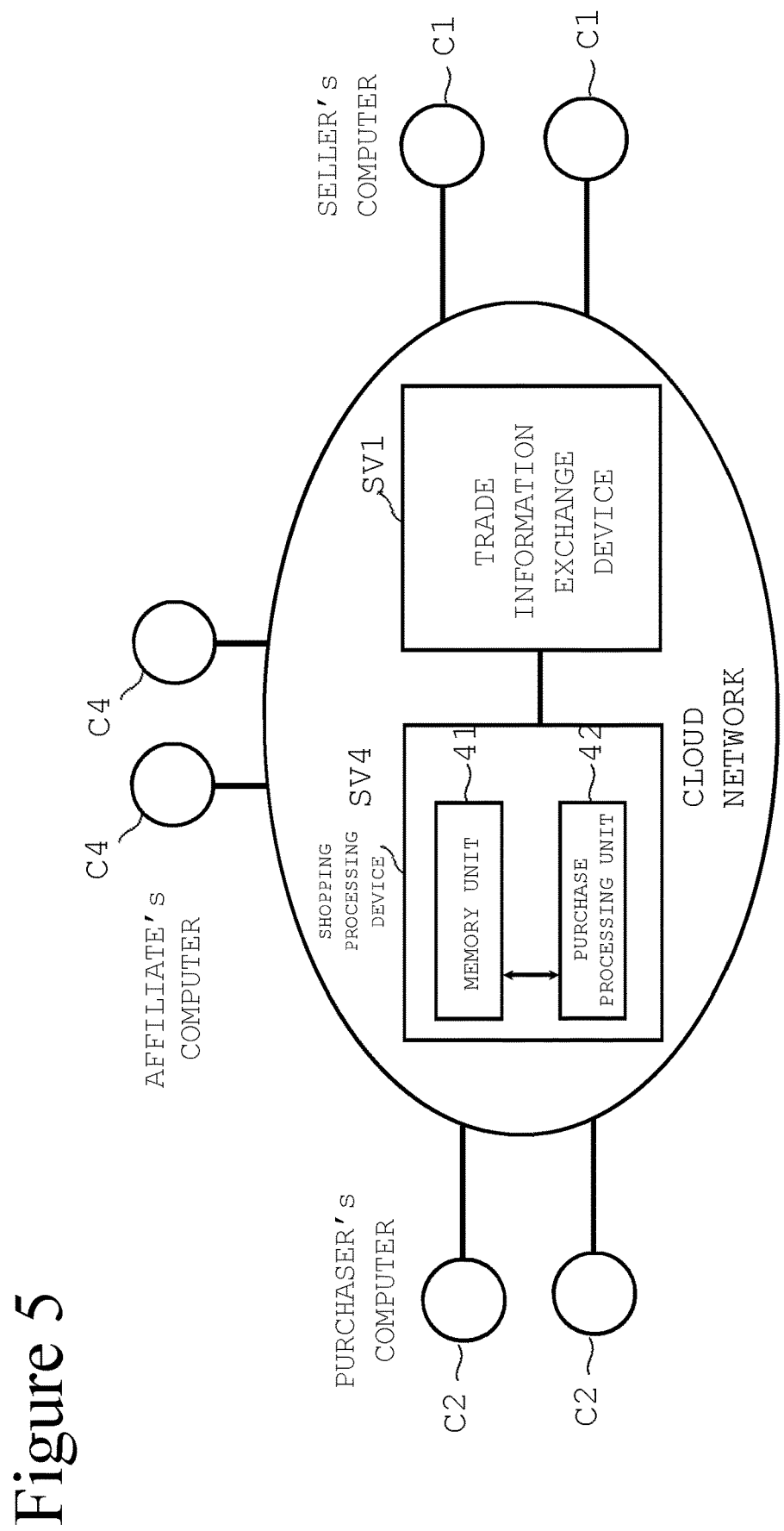
FIG. 5 is a block diagram showing a configuration of a shopping processing device SV4.

FIG. 5 is a block diagram showing the configuration of the shopping processing device SV4 according to an embodiment of the present invention. As shown in FIG. 5, the shopping processing device SV4 includes a storing unit 41 and a purchase processing unit 42, and is connected to the trade information exchange device SV1 via the network or a bus.

Figure 6:
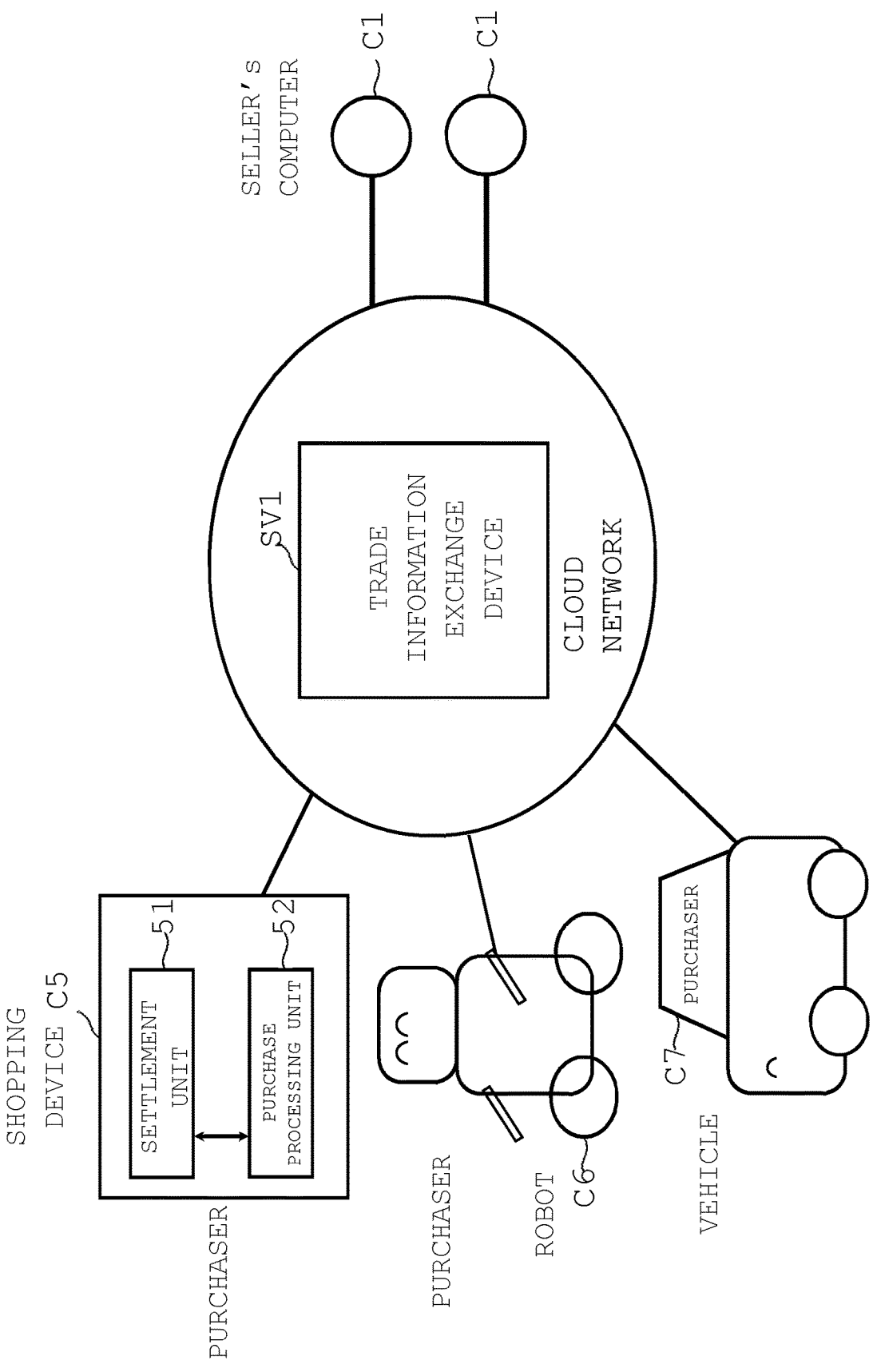
FIG. 6 is a block diagram showing a configuration of a shopping device C5.

FIG. 6 is a block diagram showing the configuration of another shopping device C5 according to an embodiment of the present invention. As shown in FIG. 6, the shopping device C5 includes a settlement unit 51 and a purchase processing unit 52, and is connected to the network. A shopping support robot C6 and a vehicle for shopping C7 includes the configuration elements of the shopping device C5, and is connected to the network. These directly communicate with a purchaser, and communicate via the network with the other shopping device C5, the trade information exchange device SV1, or the computer C1 of the seller.

In all the embodiments, each processing unit and processing means may be implemented by software using a CPU and memory, not shown.

Example 1

[Seller's Receive Terms Matched with Request of Purchaser+Tendering+Charging+Communication (Single-Sided)]

[First Trade Information Exchange Method]

There is an object where a purchaser obtains multiple estimates only by inputting the names and quantity of articles through a smartphone or the like, and buys the articles from a seller of selection. Thus, Example 1 according to the first trade information exchange method of the present invention is a method that matches a selling condition preset by the seller with a request pertaining to article purchase input by the purchaser at any time, allows matching sellers to have an access right to the purchaser through tendering, present the estimate, provide a discount coupon, and negotiates the price.

Hereinafter, the first trade information exchange method is described in detail with reference to the configuration diagram of the trade information exchange device SV1 shown in FIG. 2, the flowchart of FIG. 7, and the sequence diagram of FIG. 8. This is referred to as a single-sided scheme.

The seller preliminarily registers an account, registers contact information, and establishes a charging account in the charging unit 5. The purchaser may preliminarily register the contact information.

Figure 7:
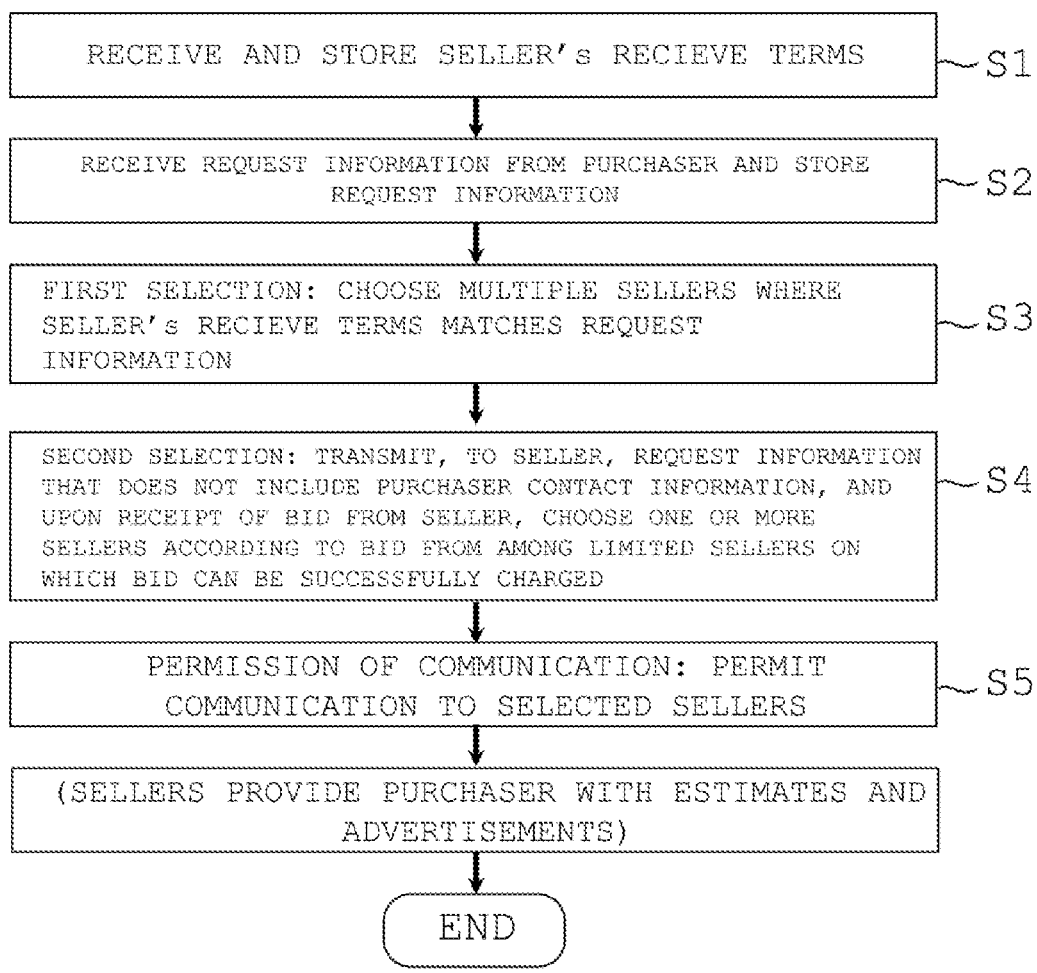
FIG. 7 is a flowchart showing a single-sided trade information exchange method (with tendering) that is according to reception condition setting by a seller and is a first trade information exchange method.
Figure 8:
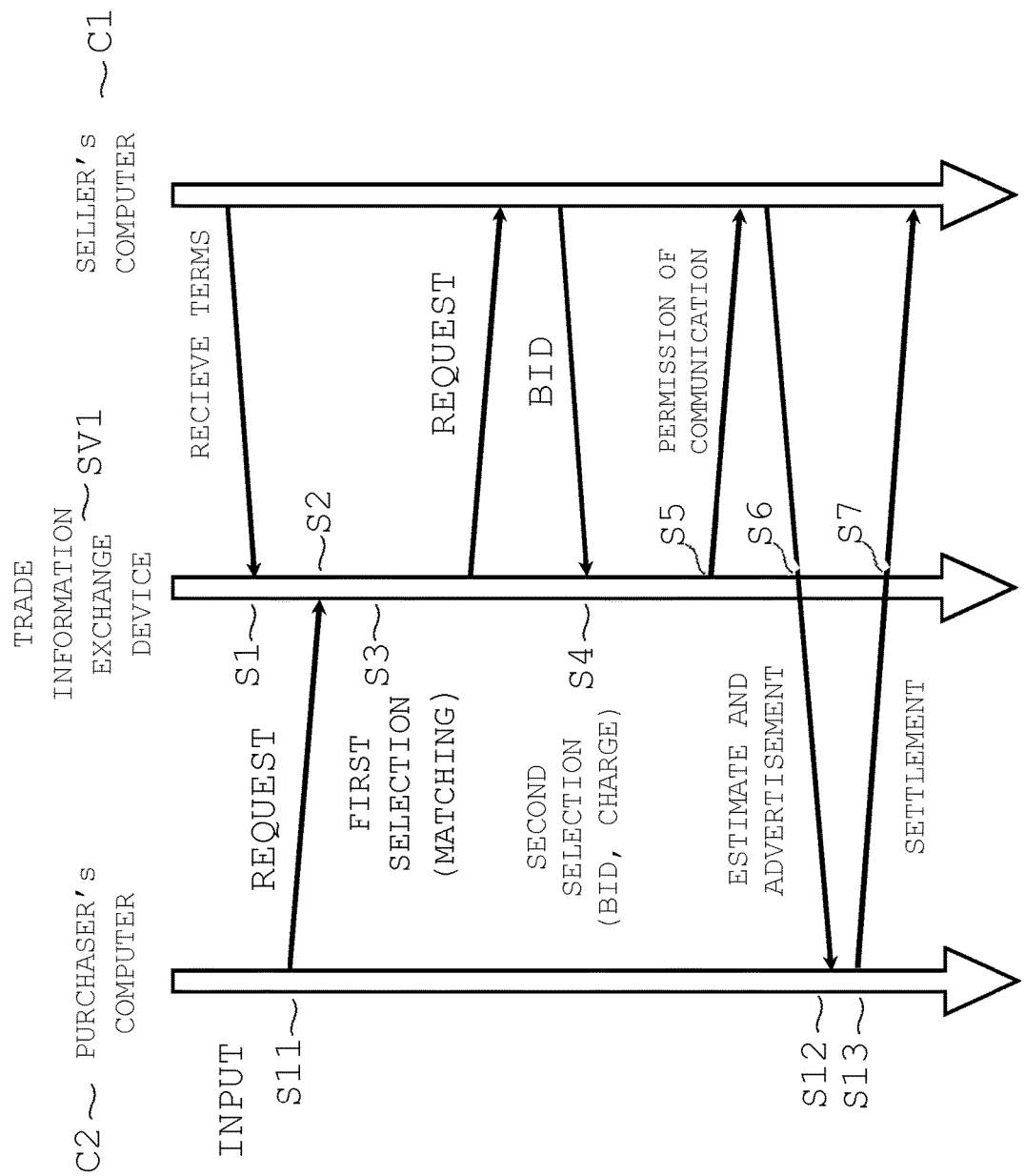
FIG. 8 is a sequence diagram of a single-sided trade information exchange method according to reception condition setting of the seller shown in FIG. 7.

In step S1 in FIGS. 7 and 8, the data processing unit 1 preliminarily causes the storing unit 3 to store a pair of the seller's receive terms received from the computer C1 of the seller and the identification information of the seller.

Here, "seller's receive terms" is a condition for receiving, by the computer C1 of the seller, request information transmitted from the computer C2 of the purchaser. For example, the conditions are considered as the sellers of "OA desk", "waterworks" and the like, a keyword of an article to be sold, the name of an article such as "C3=PO", a common article number, such as ISBN code or GTIN code, an image of an article, an address of the seller such as "Tokyo", or selling conditions such as "home delivery available", "guidance available", "quantity in stock" and the like. These are stored in the storing unit 3 in a manner of allowing conditional search. One seller may register many reception conditions. The storing unit stores many selling conditions transmitted from many sellers.

It is assumed that at a certain time point, a seller that wishes to know the purchase amount of an article or a purchaser that wishes to purchase an article inputs the article to be bought and a purchase condition into the computer C2 of the purchaser. The input may be, for example, an article selected from a list of articles with photos, or an estimate inquiry including multiple articles and purchase conditions such as "name of article: OA desk DMC12, quantity: 3; name of article: OA chair, quantity: 3; delivery time: within 2 days; delivery installation: available", text data such as "Please deliver two bottles of infant calcium milk every day."; speech such as "is there any good tour to Nagasaki for three nights and four days from September 22 with 22 adults and a rental car available?"; photos of an automobile taken through a camera by chance in a town; an article code, such as a barcode, attached to an advertisement on a newspaper or magazine; tapping and clicking an advertisement on a digital newspaper or magazine and the like. The computer C2 of the purchaser transmits such input as request information to the trade information exchange device SV1.

In step S2, the data processing unit 1 receives the request information from the computer C2 of the purchaser, and causes the storing unit 3 to store the information.

Next, in step S3, the data processing unit 1 selects multiple sellers where the request information matches the reception condition stored in step S1. This matching process is referred to as "first selection". Sellers where multiple articles and purchase conditions included in the request information are entirely or partially matched are selected. In a case with ambiguity, estimation or supplementation may be adopted.

However, for example, if 50 sellers are selected here, the number of sellers is too large for the purchaser to examine and choose the estimates and negotiate the price. The number is required to be reduced.

In step S4, the data processing unit 1 transmits the request information that does not include the contact information on the purchaser to the multiple (e.g., 50) computers C1 of the sellers matching in the first selection. The contact information is any types of communication means, such as IP address, email address and telephone number. Even if the seller receives the request information, the seller cannot identify or communicate with the purchaser. Thus, the privacy on the purchase tendency and preference is secured.

When the seller having received the request information wishes to get an order, the seller returns data representing the bid to the trade information exchange device SV1.

Here, "bid" is an amount to be presented to allow the seller to obtain a right of performing trade negotiation, presenting an estimate, or presenting an advertisement with the purchaser (right of access to the purchaser). The amount is expected much lower than an actual selling amount of an article. The bid may be manually input into the computer C1 by the seller. Alternatively, the bid may be automatically calculated according to a method preset in the computer C1 and transmitted.

The data processing unit 1 receives data representing bids from multiple (e.g., ten) sellers. The received bids may be disclosed or undisclosed to the seller. Multiple times of bids may be accepted or unaccepted.

After a predetermined bid-capable time, bidding is closed (e.g., after five minutes). Next, a predetermined number (the number of selected sellers) of sellers are selected according to the bids. However, it is required to prevent sellers with no intention of payment by means of bid of 10 billion yen from being improperly selected.

The charging unit 5 that includes the accounts of parties to be charged on a party-by-party basis and records charges to the accounts is caused to charge the bid to the account of the seller. Only successful sellers are selected. This is referred to as "second selection".

The data processing unit 1 permits the multiple sellers selected by the second selection and the purchaser having transmitted the request information to communicate with each other. This is referred to as "permission of communication".

The methods of permitting communication may be any of methods including: providing information required to establish a mutual communication path, such as an IP address, for the computers C1 of the (e.g., four) sellers selected by the second selection or the computer C2 of the purchaser having transmitted the request information; providing the contact information, such as email address or telephone number; relaying the message; and establishing a bulletin board. A method of permitting one party of the purchaser and the seller to communicate and allowing the one party to access the other party, or a method of permitting both the parties to communicate can be considered. Alternatively, a method may be adopted that does not store the contact information on the purchaser in the trade information exchange device SV1, and allows the purchaser C2 to provide the own contact information for the seller C1 permitted to communicate.

As a result of permitting such communication, the multiple sellers can transmit purchase information, that is, proposing an appropriate article to the purchaser, transmitting the estimate of the selling amount, or transmitting information on an advertisement or bonus coupon or the like. On the other hand, the purchaser can compare the four estimates and advertisements, subsequently purchase an article of the favorite seller, and further negotiate the details pertaining to the specifications of the article.

As an advantageous effect of the trade information exchange method described above, the purchaser can receive, from the multiple sellers, the purchase information, that is, the estimates, proposals or discount coupons, and chose, from among the sellers, the desired seller in consideration of the purchase amount or the delivery time, only by inputting the name of an article to be purchased and the purchase condition, transmitting rough specifications of construction to be performed, and taking photos. Even through a small screen of a smartphone, the price can be easily researched. Furthermore, as to requests for estimates of articles, discount can be expected.

On the other hand, the seller preliminarily registers the name of an article to be sold and the selling condition, thereby exerting advantageous effects that allow prospective purchase events to be delivered at any time and allow selling activities to be effectively executed. The seller preliminarily registers additional services, such as "installation" and "guidance", as the reception conditions, in the server SV1, thereby allowing price negotiation including this service to be easily advanced with the purchaser that wishes the additional service. Consequently, even a seller incapable of paying enormous advertisement cost can sell the article at a rational cost under a condition that the seller wishes, in the selling area.

Here, the number of sellers selected in the first selection step is referred to as "first number of selected sellers", and the number of sellers selected in the second selection step is referred to as "second number of selected sellers". The second number of selected sellers may range from one to multiplicity. A method preset by the party managing and operating the trade information exchange device SV1, and a method of choosing the number by the purchaser can be considered. From the viewpoint of the purchaser, as the number is larger, an inexpensive price can be obtained more easily. However, time and trouble of negotiation and selection are required. From the viewpoint of the seller, the number of selections by the seller is small, excessive price competition can be avoided.

The operator of the trade information exchange device can enjoy an advantageous effect of obtaining operation fees by charging the bid.

Hereinafter, an additional configuration adoptable in each step is described. Many of these are common to other Examples.

In first step S1, a configuration is also effective where the "information indicating the reception condition" is stored not only in one server SV1 but also in the storing units of other servers in a distributed manner, and the data processing unit included in each server executes the operation in parallel. The request information or reception conditions may be keywords simply listing the names of articles, the list and table describing the names and quantity of articles in URL encoding or XML, or rows or tables of a database.

Television programs and commercials distributed from a broadcasting station, a stream type and download type of moving images distributed from a moving image site are collectively referred to as "moving images". Moving image identification information is information for identifying individual moving images. For example, a broadcasting channel and broadcasting date and time, or a broadcast program number identification and broadcasting date and time in "service information for digital broadcasting system (ARIB STD-B10)", which is a standard of Japanese Association of Radio Industries and Businesses, such as URL or UUID, assigned to streaming moving images and moving images to be downloaded can be considered. In a case, such as of a commercial, where no identifier is assigned by a broadcasting station, the broadcasting channel and the broadcasting date and time may be used. As the date and time, an actual time is used in the on-air case, and on-air time is used in the case of recorded moving images.

As information representing the seller's receive terms, the moving image identification information on a certain moving image and the article identification information to be sold corresponding to the moving image are preliminarily received and stored. At a later date, in a case where the purchaser wishes to purchase an article displayed in a moving image during the purchaser's viewing the moving image, the moving image identification information may be received as the request information from the computer C2 of the purchaser, and the corresponding article identification information and the seller may be identified from the moving image identification information in the reception condition. It is considered that multiple sellers are considered for one moving image. Alternatively, a configuration is also effective that sequentially displays article choosing screens corresponding to scenes during viewing of the moving image, and executes the procedures by the purchaser's selection of the article. A method of selling multiple articles displayed in one moving image is described later.

In second step S2, a configuration where the trade information exchange device SV1 provides a virtual shopping cart (estimate request) encompassing multiple websites operated by different operators, the purchaser clicks an image or description of an article provided in the website to allow the article to be added to a trade shopping cart, a configuration where an estimate button is pressed and request information is received, a configuration where a desired article is selected from a list of articles and added to the shopping cart in the request information, a configuration of providing information for recommendation for the purchaser, a configuration of providing reference prices on a shopping site or a price comparison site, a configuration that can display statistical information pertaining to the purchase amount of each article in past purchase cases and input and display the evaluation and review of the seller, a configuration where a third party wishing to support anyone's purchase can provide advice information, and a configuration of providing a bulletin board for information exchange are also effective.

In third step S3 for the first selection, a configuration of choosing sellers where the request information including multiple types of articles entirely conforms to the reception condition, a configuration of choosing partially matching sellers, and a configuration switchable between both the configurations are also effective. In a case where the number of sellers with matching reception condition is large, a configuration of limiting the first number of selected sellers by the seller through a random number or means for giving a high priority to a local seller is also effective.

In fourth step S4 for the second selection, a configuration of preventing avoidance of charging through removing the telephone number or email address from the request information to be transmitted to the seller or the reception condition is also effective.

Various methods of choosing sellers can be considered. A configuration where tendering is performed through bids of selling amounts is also effective. As a method of choosing according to the bid, not only a method of choosing sellers as many as the predetermined number of selected sellers in a descending order of bid in a case of bidding for the access right to the purchaser, but also a method of choosing sellers as many as the predetermined number of selected sellers in an ascending order of bid, a method of considering the order of arrival of bid, a method of choosing with a random number being added to the bid, and a configuration where a computer of an agency transmits tendering information, can be considered. Furthermore, a method of giving a high priority to a delivery time or delivery method designated by the purchaser by reducing the priority order of the bid, a method of giving preferential treatment to sellers having weak selling power, a method of placing importance to fairness by round robin, a method of additionally considering payment reception time wished by the seller, a method of additionally considering the magnitude of amount of greenhouse effect gas emission, may be adopted. In a case where the first number of selected sellers is equal to or smaller than the second number of selected sellers, tendering is not necessary. However, it may be required to determine the amount corresponding to the bid. A method of automatically assigning a specific seller in a case where the number of sellers as a result of second selection is zero is also effective.

Charging is an action that records the bid in the charging account of the charging unit 5 as needed and subsequently performs actual deduction process, or performs immediate deduction. Typically, a bank account becomes insufficient, the charging account is frozen, and charging thereafter is failed.

A configuration where the purchase information is received together with information indicating the bid, and the purchase information received after permission of communication is presented to the purchaser is effective in reduction of the number of times of communication. However, in a case where no selection is made in the second selection, time and effort of creating an estimate is useless.

In fifth step S5 of permitting communication, a configuration reflecting the bid in an estimate caused as a result of the permission of communication or the order of display of advertisement, and a configuration where the seller permitted to communicate further performs auction pertaining to the selling price are also effective.

The purchaser may perform a login process, not shown, or present the purchaser identification information in step S2 or another timing. Consequently, the trade information exchange device SV1 can specify the contact information on the purchaser. Preferably, the purchaser identification information and the contact information are encrypted so as not to be associated with the request information or the reception condition in case of leaking from the trade information exchange device SV1.

The estimate amount may be manually input into the computer C1 of the seller owned by the seller. Alternatively, as with the bid, the data processing unit 1 included in the trade information exchange device SV1 and an operation unit (now shown) included in the computer C1 of the seller may be automatically calculated.

In the selected computer C1 of the seller, when the transmitter specifying information that specifies the computer C2 of the purchaser is once recognized by the seller, a possibility arises that annoying advertisements are transmitted to the purchaser in trade thereafter.

The data processing unit 1 may generate temporal address information that is effective only in a certain time period or the trade concerned, and provide the selected computer C1 of the seller with the generated information instead of the permanent transmitter specifying information, thereby permitting communication or providing purchaser contact information.

In this case, the computer C1 of the seller having received the address information transmits the estimate amount and advertisements from the computer C2 of the purchaser to the computer C2 of the purchaser using the temporal address information as the destination.

A trade information exchange device that includes both the functions of the server SV1 and the computer C2 of the purchaser, regards input data input from the purchaser as the request information from the computer C2 of the purchaser, and permits mutual communication with another server may be configured. More specifically, this device may be configured as a P2P type or a server, or embedded in the computer of the purchaser.

Figure 9:
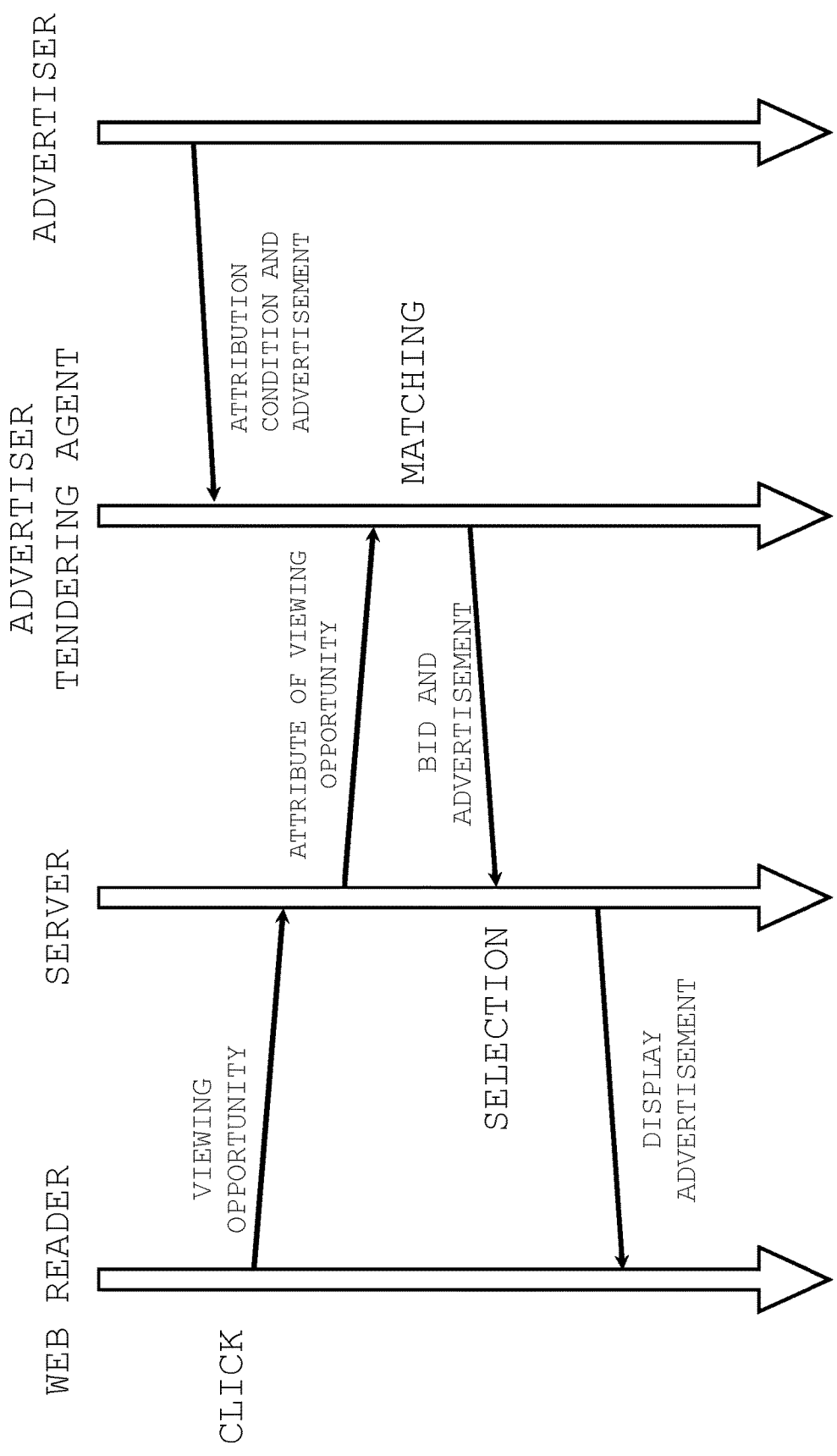
FIG. 9 is a sequence diagram of RTB shown in Patent Literature 3.

As shown in a sequence diagram of FIG. 9, the RTB described in Patent Literature 3 is a process of choosing an advertisement included in a linked page using agent technology when a certain web viewer clicks the link. An agent of an advertiser bids when the attribute of a page conforms to a standard designated by the advertiser. The server chooses one advertisement from multiple bids and displays the bid to the viewer. Behavioral targeting is typical where the taste and preference are specified from the characteristics of the website viewed from the viewer, and a matching advertisement is displayed. Some people feel "creepy" or regard an invasion of privacy.

The present invention is different in all the input, output, and communication sequence, and does not use the agent technology. Estimate information or advertisements can be provided from multiple sellers conforming to what is wished to be purchased. Furthermore, the contact of the purchaser is hidden so as not to specify the purchaser. Consequently, there is an advantageous effect of securing privacy.

Example 2

[Purchaser's Receive Terms Matched with Transmission Data of Seller+Tendering+Charging+Communication (Inverted Single-Sided)]
[Second Trade Information Exchange Method]

There is an object where the purchaser obtains estimates as needed only by inputting the name and quantity of articles, and buys the articles from a seller of selection. Thus, Example 2 according to the second trade information exchange method of the present invention is a method that matches a condition preset by the purchaser with campaign information and the like pertaining to articles to be transmitted as needed from the seller side, allows sellers to have an access right to the matching purchaser through tendering, present the estimate, provide a discount coupon, and negotiate the price.

Figure 10:
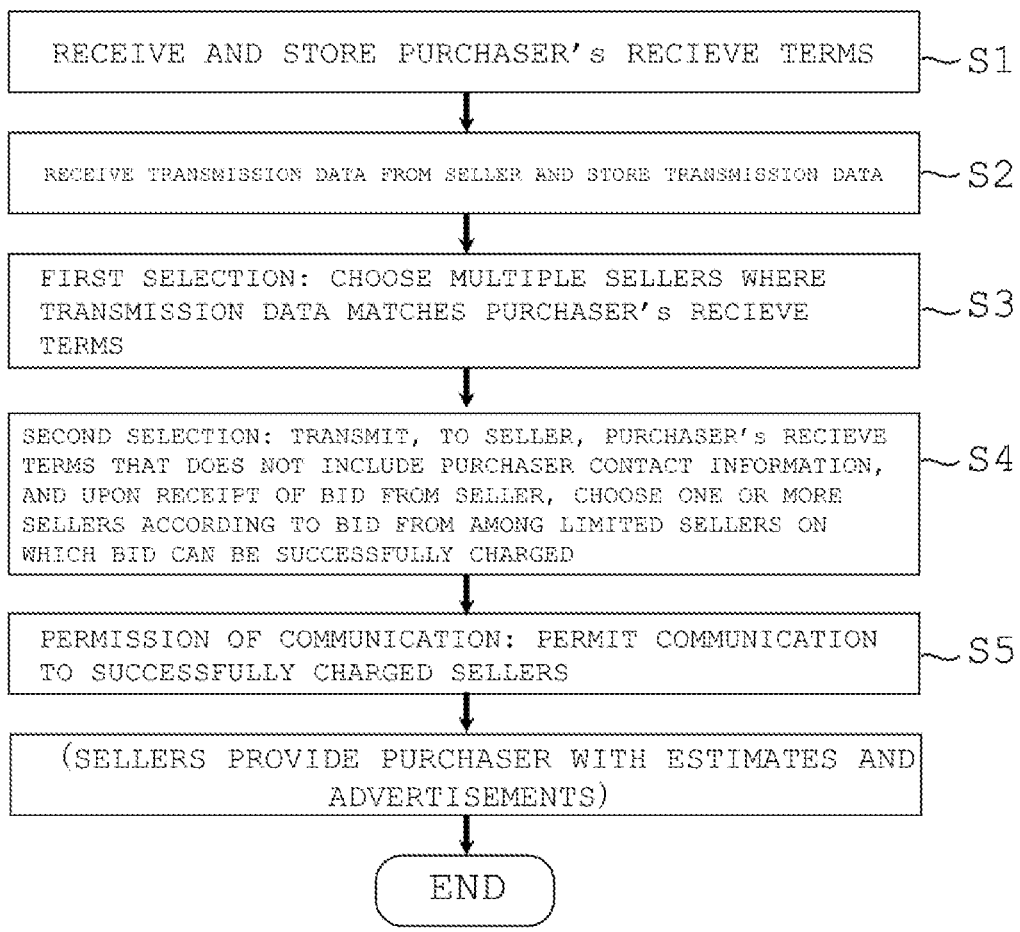
FIG. 10 is a flowchart showing an inverted single-sided trade information exchange method (with tendering) that is according to reception condition setting by a purchaser and is a second trade information exchange method.
Figure 11:
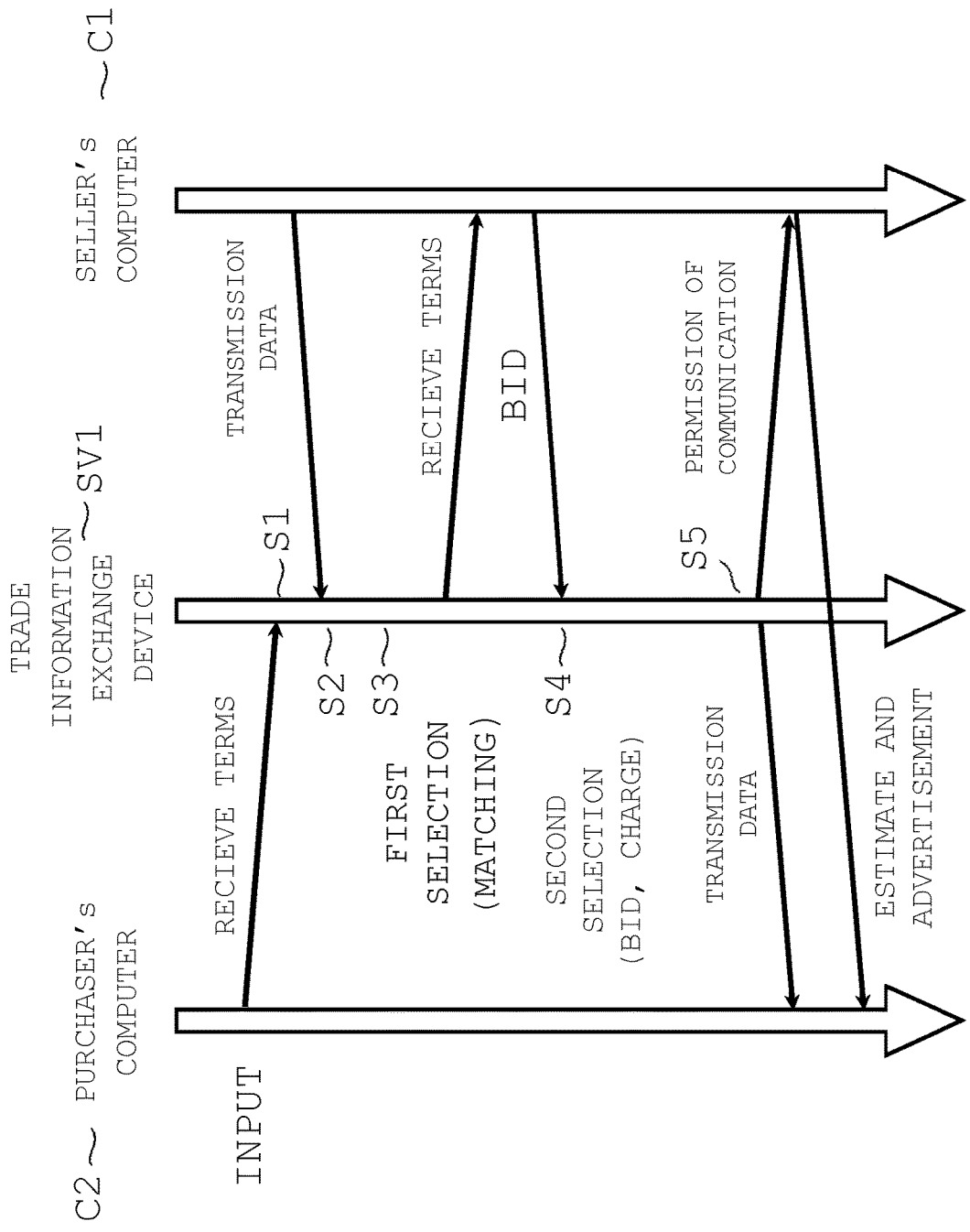
FIG. 11 is a sequence diagram of an inverted single-sided trade information exchange method according to reception condition setting of the purchaser shown in FIG. 10.

Description is made with reference to the configuration diagram of the trade information exchange device SV1 shown in FIG. 2, a flowchart of FIG. 10, and a sequence diagram of FIG. 11. This is referred to as an inverted single-sided scheme. In the trade information exchange device SV1, the data processing unit 1 performs the following processes.

In step S1, the data processing unit 1 preliminarily causes the storing unit 3 to store the reception condition supplied from the computer C2 of the purchaser. For example, the name of an article or the like wished by the purchaser, and words and the like indicating the purchase quantity can be considered. More specifically, it can be considered that a purchaser planning to purchase an air conditioner registers a keyword "air conditioner" or a model name and quantity, purchase conditions, such as "installation work: available", "place: Ibaraki", "price range: XX yen to XX yen".

Next, in step S2, the data processing unit 1 receives transmission data items transmitted from the respective computers C1 of the sellers, and causes the storing unit 3 to store the information.

Here, for example, when the seller wishes to perform a campaign of air conditioners, the seller transmits transmission data that includes the keyword "air conditioner" and the selling condition. As summer approaches, many air conditioner sellers project such campaigns. Consequently, it is predicted that the many transmissions are made every day. In a case where the purchaser receives the transmission data every time the seller transmits the transmission data, the purchaser feels burdensome such as in a case of email spam, and too much transmission data makes comparison and examination difficult.

Here, in step S3, the data processing unit 1 accumulates the transmission data in a predetermined time period, for example, twice a day. The transmission data matching the purchaser's receive terms is extracted every time period. This process is also referred to as "first selection".

In step S4, the data processing unit 1 transmits "purchaser's receive terms" that does not include the contact information on the purchaser to the multiple computers C1 of sellers matching in the first selection. Here, the purchaser's receive terms is thus adopted because the condition includes a model number, quantity, and purchase condition of the air conditioner wished by the purchaser. Hereinafter, steps analogous to those of Example 1 described above are executed. That is, the data processing unit 1 performs the second selection that chooses the seller through tendering, and permits communication.

As described above, the purchaser can obtain information pertaining to proposals and estimates from multiple sellers matching the condition in consideration of the article and the like and choose the seller matching the preference of the purchaser, only by inputting information on the article wished by the purchaser into the computer C2 of the purchaser.

On the other hand, the seller can transmit information on the article wished to be sold and the bid to the trade information exchange device SV1, in turn, transmit campaign information to the purchaser wishing to purchase the article, and obtain a chance of starting trade negotiation.

In Example 1 described above, the request information of the purchaser may be stored and used as the purchaser's receive terms in this Example 2.

In first step S1, a configuration where when the purchaser registers the reception condition (keyword), a notification reaches the seller, and the seller transmits the transmission data is also effective.

In second step S2, a configuration where the bid and advertisement are received together with the transmission data from the seller, and some steps are omitted is also effective. However, a detailed proposal conforming to the wish of the purchaser is difficult.

In third step S3, a configuration where in a case where the number of matching sellers is one, communication is immediately permitted, and a configuration where charging is made according to past achievements of bids for similar keywords may be adopted.

Example 3

[(Double-Sided Scheme; with Tendering)]

In one trade information exchange device, in consideration of a demand for performing both a process for an estimate request from the purchaser and a process of distributing campaign information from the seller, combination of the first trade information exchange device and the second trade information exchange device is also effective.

Figure 12:
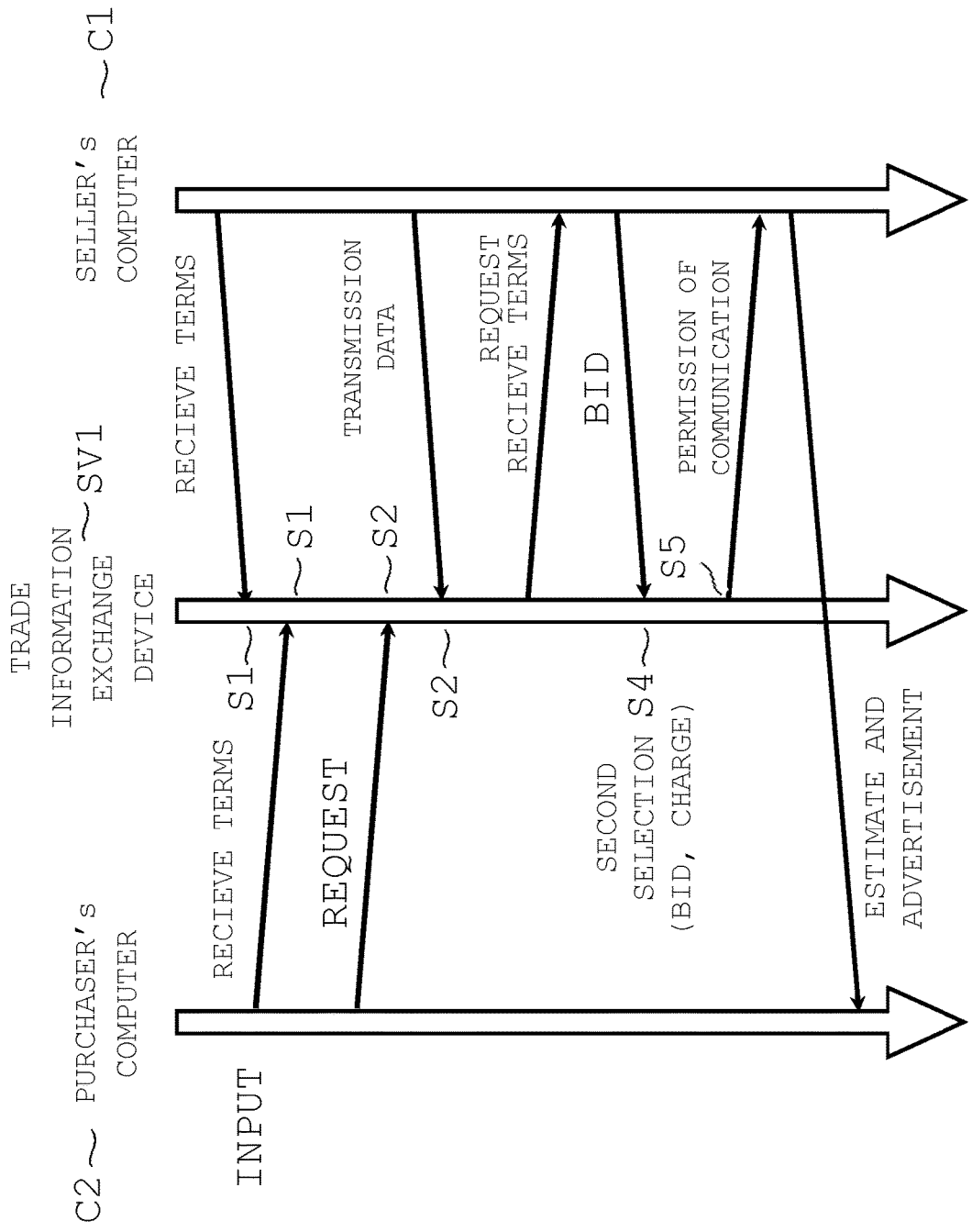
FIG. 12 is a sequence diagram showing a double-sided trade information exchange method (with tendering).

FIG. 12 shows a sequence diagram according to this Example. This is referred to as a double-sided scheme. In the trade information exchange device SV1, the data processing unit 1 performs the following processes.

In this case, in first step S1, the storing unit 3 is caused to store both the purchaser's receive terms transmitted from the computer C2 of the purchaser and the seller's receive terms transmitted from the computer C2 of the seller. Any order can be adopted, and only one side is also allowed.

In second step S2, both the request information from the purchaser and the transmission data from the seller can be accepted. In both cases, the following third step S3 to fifth step S5 are executed by the data processing unit 1.

Such a trade information exchange device SV1 exerts an advantageous effect of allowing one trade information exchange device to perform both a process of an estimate request from the purchaser and a process of distributing campaign information from the seller. For example, it is expected that the request transmitted by the purchaser and the achievements of purchase are stored in the storing unit 3, and guidance is transmitted from the seller to the purchaser tending to be interested to thereby exert a highly advantageous effect.

Example 4

[Without Tendering (Double-Sided Scheme)]

A trade information exchange method at no charge or fixed charges requires a configuration without tendering.

Figure 13:
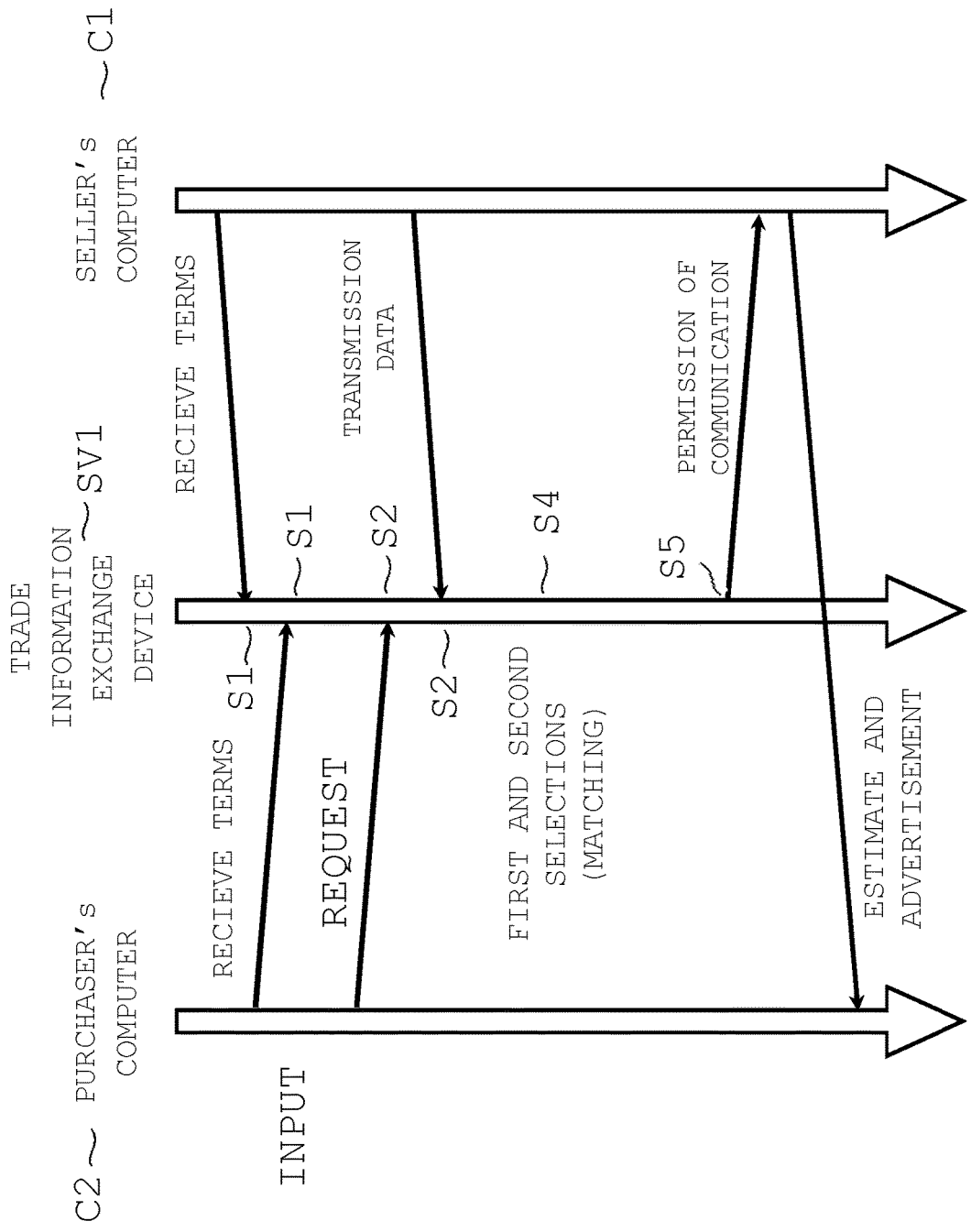
FIG. 13 is a sequence diagram showing a double-sided trade information exchange method (without tendering).

FIG. 13 shows a sequence diagram of a double-sided scheme without tendering. In the trade information exchange device SV1, the data processing unit 1 performs the following processes.

From first step S1 to second step S2 are analogous to those in Example 3. Third step S3 and fourth step S4 are the first selection and the second selection. Instead of transmission of the request information and the reception condition to the seller and accepting tendering, sellers where the request information matches the seller's receive terms or sellers where the transmission data matches the purchaser's receive terms are selected, and selection is performed according to a predetermined criterion. Various selection criteria described in Example 1 can be considered as the criterion of selection. The selection here is also referred to as the second selection.

A procedure of permitting communication in fifth step S5 is analogous to that in the above description.

This exerts an advantageous effect of capability of providing the trade information exchange method that does not perform tendering at no charge or at a fixed charge.

In all Examples, a configuration of combination of configurations with and without tendering is effective; for example, in a case of a request from the purchaser, the configuration without tendering is adopted, and in a case of operation from the seller, the configuration with tendering is adopted.

Example 5

[Matching Even at the Time of Reception Condition Setting (Double-Sided Scheme; with Tendering)]

The schemes described above have a problem in that occurrence of request information and transmission data is required to be waited.

Figure 14:
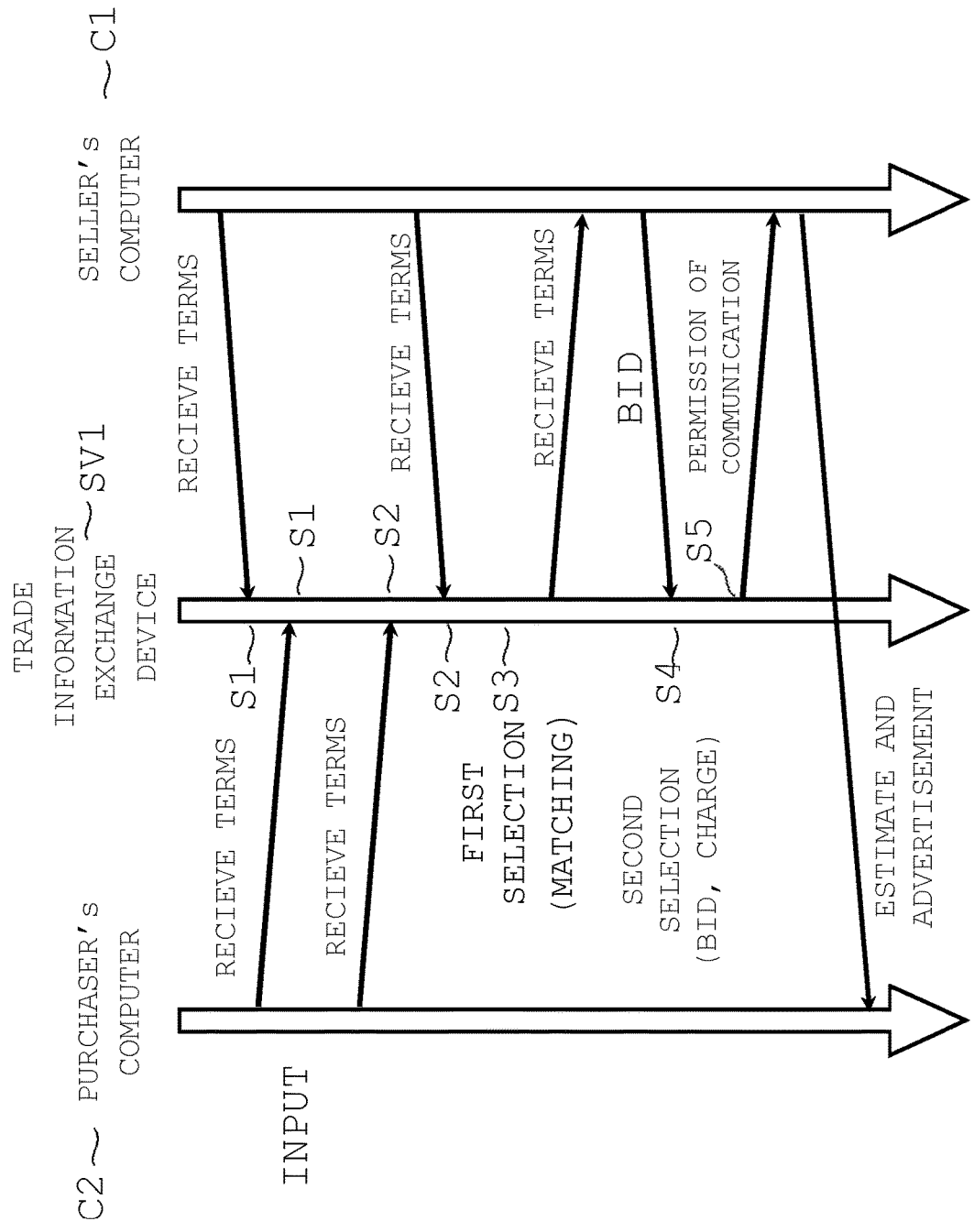
FIG. 14 is a sequence diagram showing a double-sided activation method at the time of reception condition setting (with tendering).

FIG. 14 shows a sequence diagram of a double-sided scheme that starts matching immediately at the time of reception condition setting. In the trade information exchange device SV1, the data processing unit 1 performs the following processes.

In July, which is the sale time period of air conditioners, it can be considered that there are many sellers wishing to buy popular models and many sellers wishing to sell the models, these parties each resister the reception condition. With reference to the storing unit 3 in FIG. 2 in detail, the double-sided scheme stores the purchaser's receive terms and the seller's receive terms.

In first step S1 and second step S2, upon receipt of the purchaser's receive terms, the condition is stored in the storing unit 3, and subsequently, the seller's receive terms in the storing unit 3 is retrieved. For example, in a case where the purchaser wishes to receive information pertaining to "air conditioner" and register the reception condition, in third step S3, the condition is matched with the "air conditioner" having already been registered by the seller. When multiple sellers are found, the second selection including tendering is performed in fourth step S4, and communication is permitted in fifth step S5.

In first step S1 and second step S2, upon receipt of the seller's receive terms, the reception conditions of the purchasers in the storing unit 3 are searched for whether there is any purchaser having the campaign information in an analogous manner. Hereinafter, the description is analogous.

This exerts an advantageous effect of capability of starting registration of the reception condition, transmission and reception of the campaign information, purchase negotiation.

Example 6

[Matching Even at the Time of Reception Condition Setting (Double-Sided Scheme; without Tendering)]

A trade information exchange method at no charge or at fixed charges requires a configuration without tendering in the above description.

Figure 15:
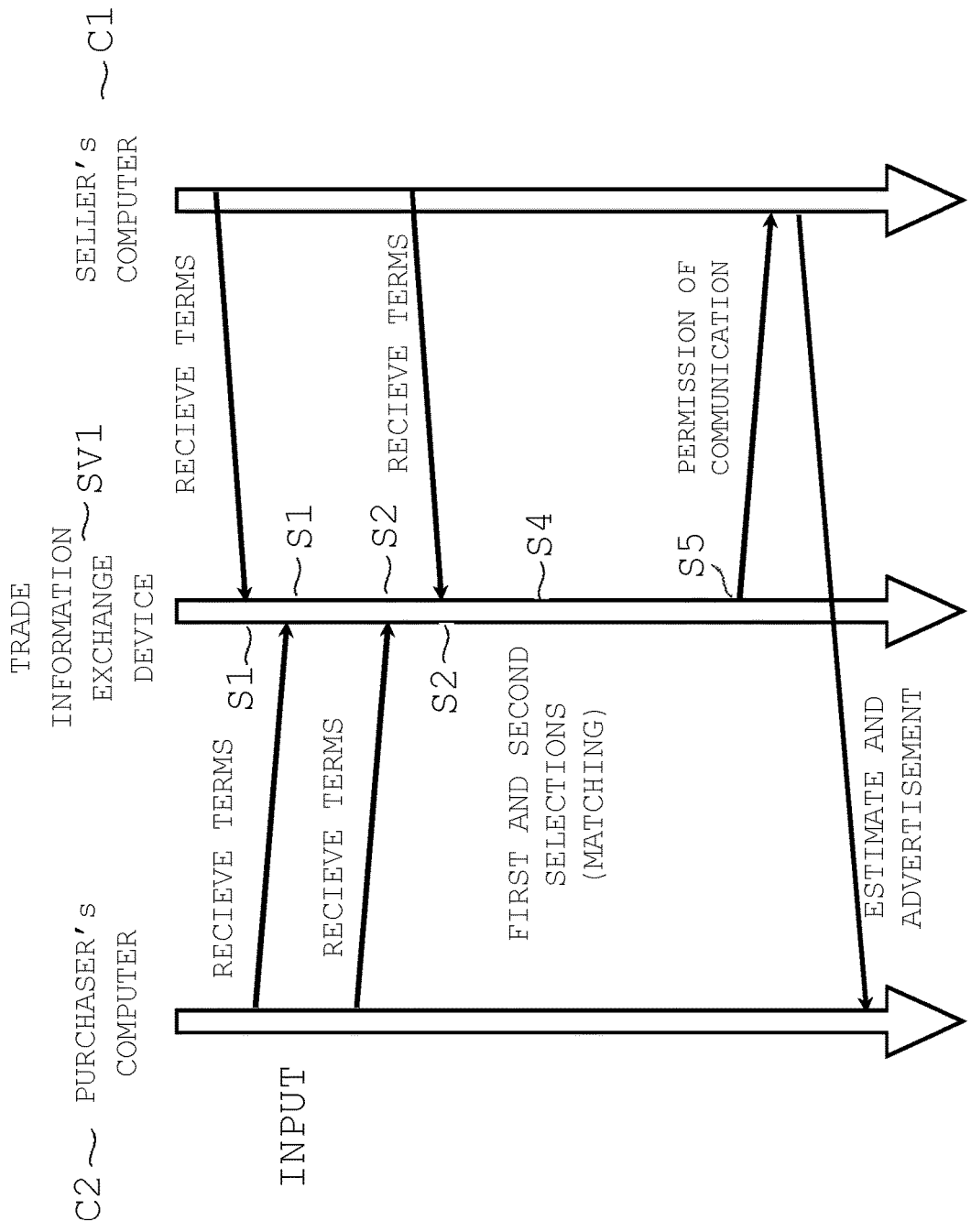
FIG. 15 is a sequence diagram showing a double-sided activation method at the time of reception condition setting (without tendering).

FIG. 15 shows a sequence diagram of a double-sided scheme that starts matching immediately at the time of reception condition setting and without tendering. In the trade information exchange device SV1, the data processing unit 1 performs the following processes.

From first step S1 to second step S2 are analogous to those in Example 5. Third step S3 and fourth step S4 are the first selection and the second selection. Instead of transmission of the request information and the reception condition to the seller and accepting tendering, one or more sellers are selected according to a predetermined criterion from sellers where the purchaser's receive terms matches the seller's receive terms. Various selection criteria described in Example 1 can be considered as the criterion of selection. The selection here is also referred to as the second selection.

A procedure of permitting communication in fifth step S5 is analogous to that in the above description.

This exerts an advantageous effect of capability of providing the trade information exchange method that does not perform tendering at no charge or at a fixed charge.

Example 7

[Retrieval of Reception Condition+Tendering]

The seller requires easily knowing where the demand is, that is, the customer to buy the article of the company of the seller among many people in the world.

The storing unit 3 stores a large amount of names and keywords of articles registered as the reception conditions by many purchasers. This can be referred to as "sea of demand". The user may transmit a keyword and information pertaining to the area which serves as search terms to the trade information exchange device, such as the server SV1, to thereby perform search, and attractive proposal of selling may be made to purchasers matching the search condition.

Figure 16:
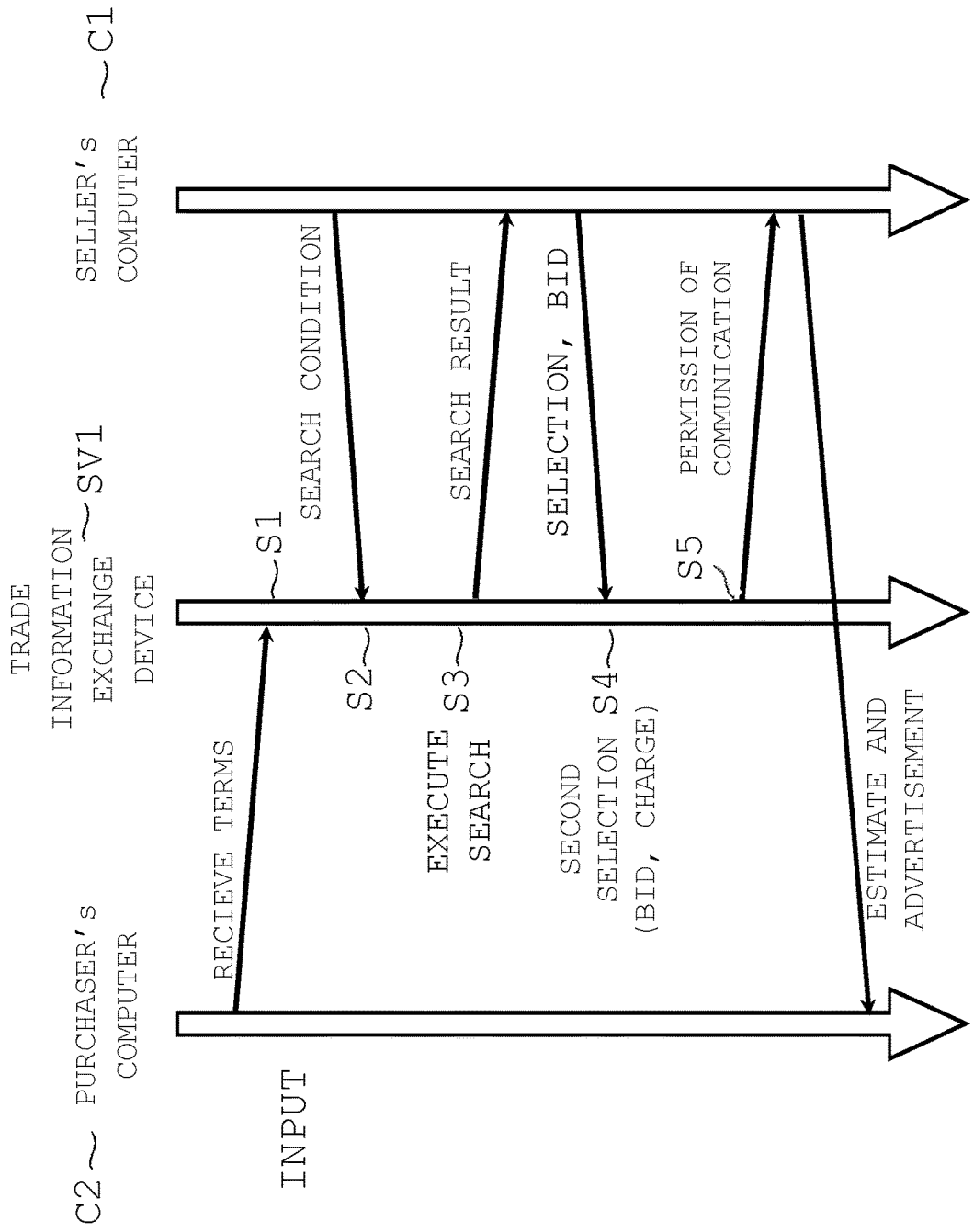
FIG. 16 is a sequence diagram showing a reception condition retrieving method (with tendering).

FIG. 16 shows a sequence diagram according to retrieval of the reception condition. In the trade information exchange device SV1, the data processing unit 1 performs the following processes. Here, the purchaser and the seller are collectively referred to as users.

In first step S1, the portion where the storing unit 3 receives the purchaser's receive terms and stores the condition is analogous.

In second step S2, a search condition is received from a user that wishes search the sea of demand. For example, it is "air conditioner DMC12 Ibaraki". The reception conditions stored in the storing unit 3 are searched, and a list of combinations of matching reception conditions and the identifiers is created.

In third step S3, this list is transmitted as a search result to the computer of the user.

However, on a summer-approaching hot day, the number of sellers searching destinations of selling of air conditioners becomes large, and it is considered that the number of sellers choosing the conditions of the same purchasers from the search result is large. If the purchasers receive invitations every time the seller searches, their daily lives are impeded.

In fourth step S4, the data processing unit 1 receives, from the user performing search, the identifier assigned to the reception condition selected from the search result and the corresponding bid. Furthermore, multiple users are selected according to the bid from among users succeeding in charging of the bid in the charging unit 5, and adopted as the second selection.

In fifth step S5, the data processing unit 1 permits the computers of the users selected in the second selection to communicate with the computer of the purchaser or seller whose reception condition is registered.

Thus, when the seller searches the reception conditions of the purchasers, opportunities of selling articles wished to be sold can be found and the demand for each article can be researched. On the other hand, when the purchaser searches the conditions of the purchasers, well-selling articles can be identified. When the purchaser searches the reception conditions of the sellers, it can be identified which seller sells the article and the like wished to be purchased. In view of the purchaser, a configuration is required where the search result does not include information identifying the purchaser.

Search of "Wish List" of Amazon® is a function of displaying "Wish List" of a person in response to input of a name and email address of the person, but is different from search for selling opportunities for the name of article according to the present invention.

Example 8

[Retrieval of Reception Condition; without Tendering]

A trade information exchange method at no charge or at fixed charges requires a configuration without tendering in the above description.

Figure 17:
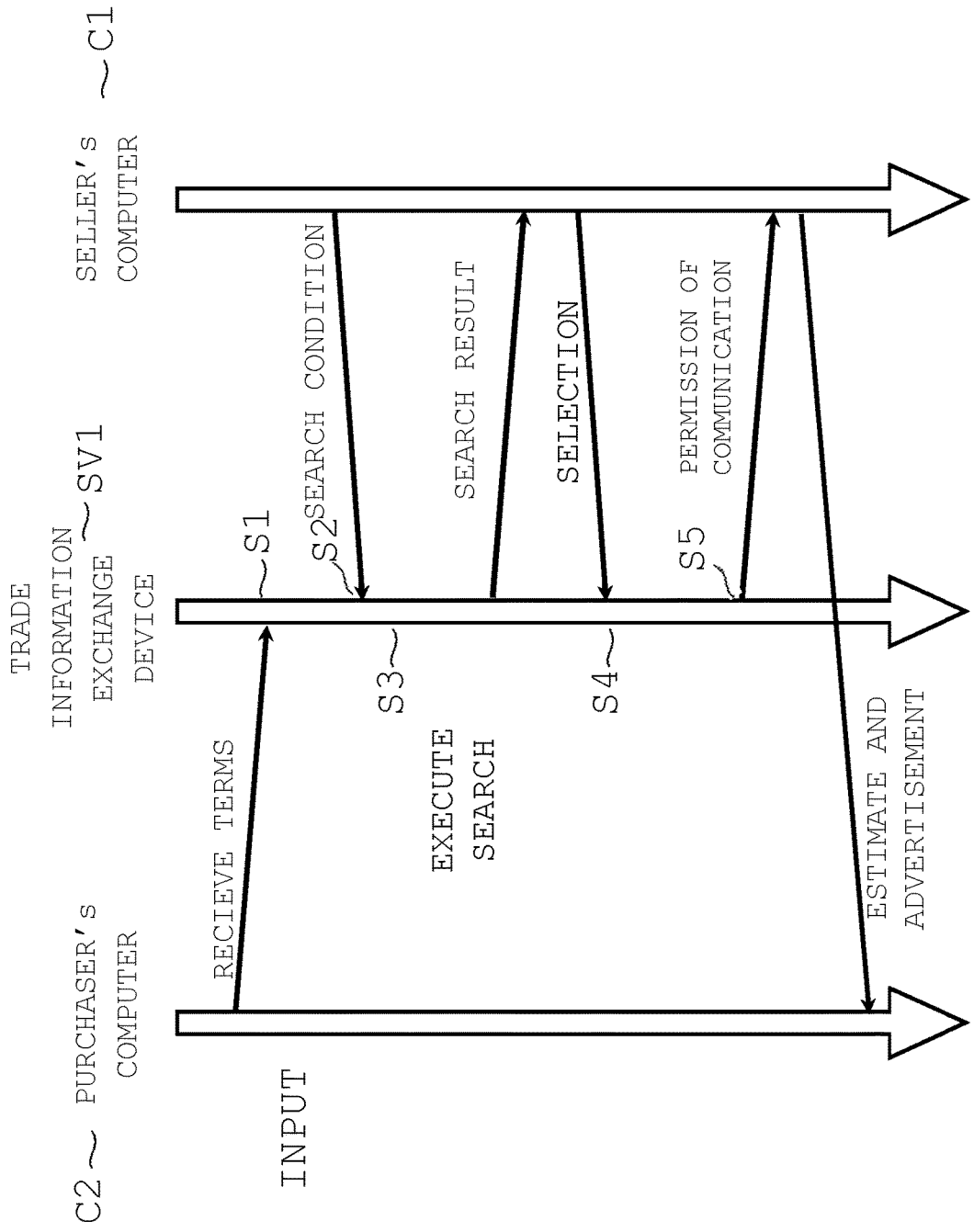
FIG. 17 is a sequence diagram showing a reception condition retrieving method (without tendering).

FIG. 17 shows a sequence diagram according to retrieval of the reception condition without tendering. In the trade information exchange device SV1, the data processing unit 1 performs the following processes.

From first step S1 to third step S3 are analogous to those in the above description.

In fourth step S4, the data processing unit 1 receives, from the user performing search, the identifier assigned to the reception condition selected from the search result, but does not receive the bid. One or more sellers are selected according to a predetermined criterion from among sellers where the purchaser's receive terms matches the reception conditions of the sellers. Various selection criteria described in Example 1 can be considered as the criterion of selection. The selection here is also referred to as the second selection.

A procedure of permitting communication in fifth step S5 is analogous to that in the above description.

This exerts an advantageous effect of capability of providing the trade information exchange method that does not perform tendering at no charge or at a fixed charge.

Example 9

[Natural Language and Image]

A configuration where the request information, transmission data, reception condition or search condition includes at least one of a keyword, the name of an article, quantity, an article code, an image, a speech, a selling condition, a purchase condition, an advertisement transmission condition, and an advertisement reception condition, described above, is effective.

The purchaser may use a smartphone to take an image of an article which the purchaser wishes, and adopts the image as the request information, and matching against the photo of an equivalent article registered by the seller may be made in an image level.

Furthermore, in cases of speech information input by the purchaser or the seller through speech, and photos that have been taken by the purchaser and include articles wished to be purchased, photos with written names of articles wished to be purchased, and barcode, a configuration of extracting the names and quantities of articles wished to be purchased through application of the speech recognition technology and image processing technology and subsequent natural language processing is effective. Text is recognized by the natural language processing. For example, the data processing unit 1 having received text or a speech such as "Please deliver two bottles of milk every day. Together with them, please deliver a bag of disposable diapers." extracts content such as "two bottles of milk with a condition of delivery every day; one pack of disposable diapers with a condition of delivery", encodes the content into a predetermined format, and adopts the encoded content as the request information.

At this time, the process, such as speech recognition, may be performed as preprocesses by the computers C1 and C2 of the purchaser and seller and subsequent transmission to the trade information exchange device SV1. Alternatively, transmission may be made to the trade information exchange device SV1 without any preprocess, and purchase target extraction process may be performed by the trade information exchange device SV1. Alternatively, a third server may be used to execute a preprocess with a large load.

At this time, a method is considered that words such as "milk" and "bag of disposable diapers" are extracted from the request information through, for example, the natural language processing and subsequently the matching is executed. However, if the extraction as described above is performed through the natural language processing, extraction correctly reflecting the intention of the transmitter of the request information is not performed in some cases. To solve such a problem, a high computational capability and a huge database are required.

Thus, for example, the transmitter's inclusion of marked data into the transmission data is effective means; the data is annotated with brackets immediately before and after the keywords indicating articles wished to be purchased, such as "milk" or "bag of disposable diapers". This is because the data processing unit 1 can use the annotations as marks and securely extract information to be recognized as keywords by the transmitter, thereby allowing required computational capability to be reduced.

If execution of the natural language processing cannot extract a clear keyword, purchase history information stored in the storing unit 3 may be referred to and the keyword may be estimated based on the similarity between character strings.

A display for displaying the presented estimate information and audio output means may be provided.

Example 10

[Selection of Additional Service (Multi-Sided Scheme)]

There is a demand that when a trade of an article is concluded between the purchaser and the seller and accompanying additional services such as delivery and long-term guarantee are required, sellers of the additional service are required to be efficiently selected. At this time, in a case of many sellers wishing to provide the additional services, it is a problem how to choose the seller from among these sellers.

To solve such a problem, a configuration is effective where the data processing unit 1 matches the information pertaining to a trade concluded between a certain purchaser and seller with the reception condition set by a second seller other than the above seller, and chooses multiple matching sellers and adopts these sellers as the first selection, subsequently performs the second selection through tendering having been described, and permits communication between the thus selected second seller, the purchaser and seller of the first purchase.

Description is made using an example of delivery of the purchased article as the additional service. A deliverer preliminarily transmits information indicating a delivery condition pertaining to an article and area which the deliverer wishes to gain, and the information is stored as the seller's receive terms in the storing unit 3. When the trade is concluded between the purchaser and the seller, the data processing unit 1 chooses multiple deliverers where the condition of the article required to be delivered and the condition pertaining to the positions of the purchaser and the seller match the delivery condition. A condition that a delivery vehicle of the deliverer is present near the shop may be additionally considered.

The data processing unit 1 transmits information pertaining to the delivery item and area with the contacts of the purchaser and seller being hidden, to the computer C3 of the selected deliverer. At this time, the deliverer obtains a right of bidding and delivery. A configuration may be adopted where the delivery charge is determined through tendering, and a deliverer presenting the most inexpensive delivery charge is selected. Alternatively, another configuration may be adopted where tendering pertaining to a right of proposing the delivery charge to the purchaser or seller is performed, the purchaser or seller receives the proposal of the delivery charge from multiple deliverers selected as a result of the tendering, and one deliverer is selected.

Such an embodiment can effectively choose a provider of a service to be added to the trade concluded between the purchaser and the seller.

Example 11

[Purchasers as Many as Number According to Bid]

Here, according to the example of purchasing the air conditioner in summer described above, as it becomes hot, the number of purchasers wishing installation of air conditioners becomes large. Accordingly, it is a problem how to distribute the number.

In step S4 shown in FIG. 11, it is considered that the data processing unit 1 permits communication with computers C2 of the purchasers the number of which is according to the bid presented by the computer C1 of the seller, or provides the purchaser contact information to these computers.

The aforementioned "number (of which) according to the bid" means the number of computers of purchasers that corresponds to the number of proportional divisions or ratio according to the bid of each seller, for example. In this example, as the seller using the computer C1 of the seller presents a higher bid, the transmission data can be transmitted to more computers C2 of the purchasers.

The trade information exchange method as described above makes the business negotiation opportunities between the seller using the computer C1 of the seller and the purchaser using the computer C2 of the purchaser be according to the bid. Consequently, "winner-takes-all" is not realized, and opportunities of proposals can be given to the sellers incapable of providing high bids.

Example 12

[Settlement for Purchaser]

In the above description, a configuration is also effective where the data processing unit 1 acts as an intermediate of exchanging information required for trade a negotiation such as specification data on the article and data indicating between the computer C1 of the seller provided with the permission of communication or purchaser contact information in step S5 in FIG. 8 and the computer C2 of the purchaser in step S6, and when the negotiation is settled between the seller and the purchaser through such information exchange, the settlement unit 7 is caused to execute a process of making payment on the basis of the information indicating the selling price determined by the negotiation in step S7.

Example 13

[Combination of Sellers]

When one estimate inquiry made by the purchaser includes multiple articles, it is sometimes difficult for one seller to provide all the articles at one time. For example, it is assumed that a purchaser that has a cold and intends to work at home is required to buy "cold remedy, a wireless router, and pajamas" immediately. A huge shopping site having a wide assortment of merchandise can sell all articles, but the site requires delivery days and the purchaser cannot buy immediately. Consequently, the purchaser wishes to find a pharmacy, a personal computer shop and a clothing store that have stocks, and go to buy the articles immediately. There is a problem in that instead of individually finding sellers of the three articles, the purchaser wishes to find the articles through transmission of one piece of request information "shops where the purchaser allowed to go to buy cold remedy, a wireless router, and pajamas".

Such a pharmacy and the like are considered to be existed in a shopping area in front of a station, a neighboring large shopping mall, a franchise along a principal road and the like. The inexpensiveness of articles is not necessarily conclusive. The atmosphere of shop and convenience of accompanying shopping, and preference of design of cloths are also important for the purchaser.

Hereinafter, referring to FIGS. 18 and 19, a trade information exchange method for solving this problem is described in detail. In the trade information exchange device SV1, the data processing unit 1 performs the following processes.

Step S1 is analogous to that in the above description.

In second step S2, request information that includes the names of articles which the purchaser wishes to buy and purchase conditions is received from the computer C2 of the purchaser.

In third step S3, the data processing unit 1 chooses sellers where a part of multiple articles wished to be purchased or a part of purchase conditions matches the seller's receive terms.

Figure 19:
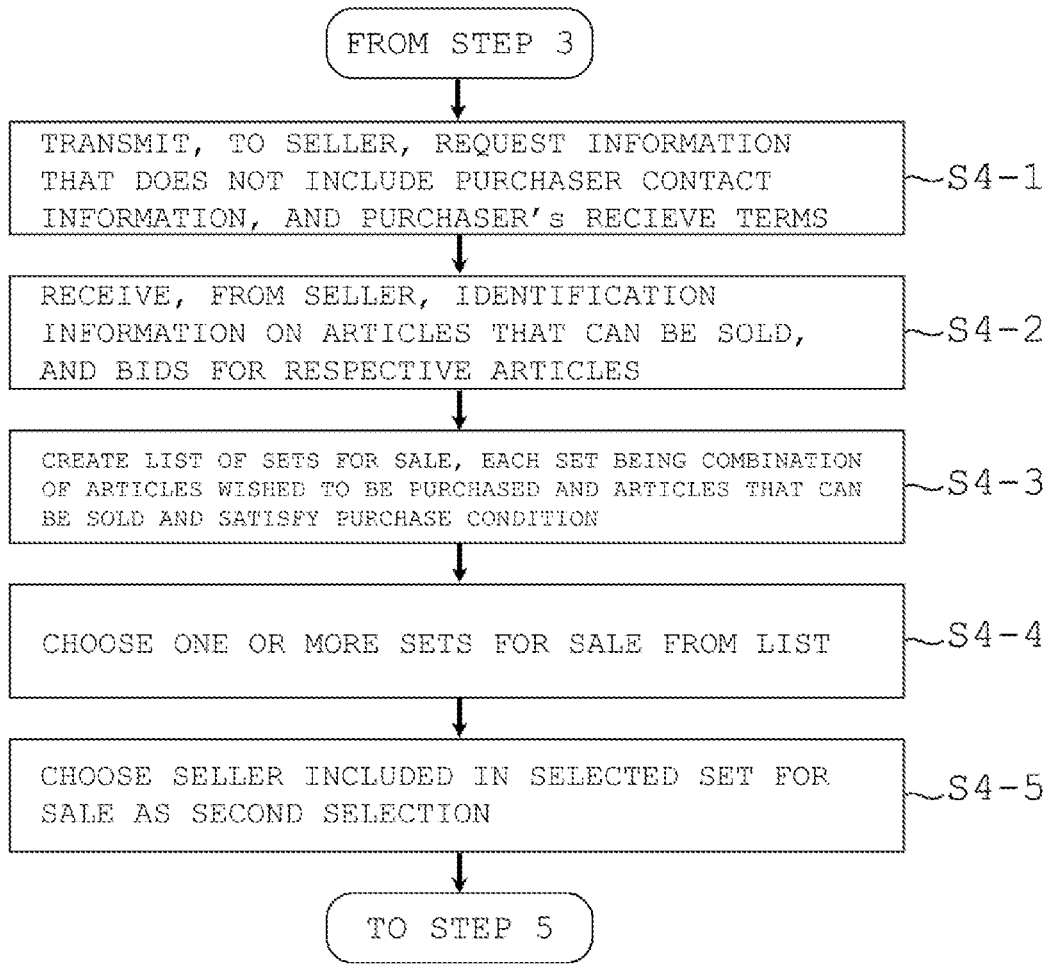
FIG. 19 is a flowchart showing the detail of step S4 in the method of purchasing multiple articles.

Fourth step S4 is further branched off to the five steps in FIG. 19. In a case of multiple combinations of sellers satisfying the multiple articles wished to be purchased, a list of the combinations is created, and a combination is selected from the list. Referring to FIG. 19, description is made as follows.

In first sub-step of the fourth step S4-1, the request information that does not include the purchaser contact information, or the reception condition is transmitted to the computer of the selected seller.

In second sub-step of the fourth step S4-2, the identification information on articles that can be sold, and information that indicates the bids for the respective articles are collectively received from the seller. Each seller may be incapable of providing all the articles.

In third sub-step of the fourth step S4-3, a combination of identification information of the articles wished to be purchased and the seller corresponding to the articles that can be sold and satisfy the purchase conditions is selected and adopted as one set for sale. In a case of multiple satisfying combinations, a list of multiple sets for sale is created.

In fourth sub-step of the fourth step S4-4, one or more sets for sale are selected from the list.

In fifth sub-step of the fourth step S4-5, the second selection that chooses a seller included in the selected set for sale according to a predetermined criterion is performed.

Figure 18:
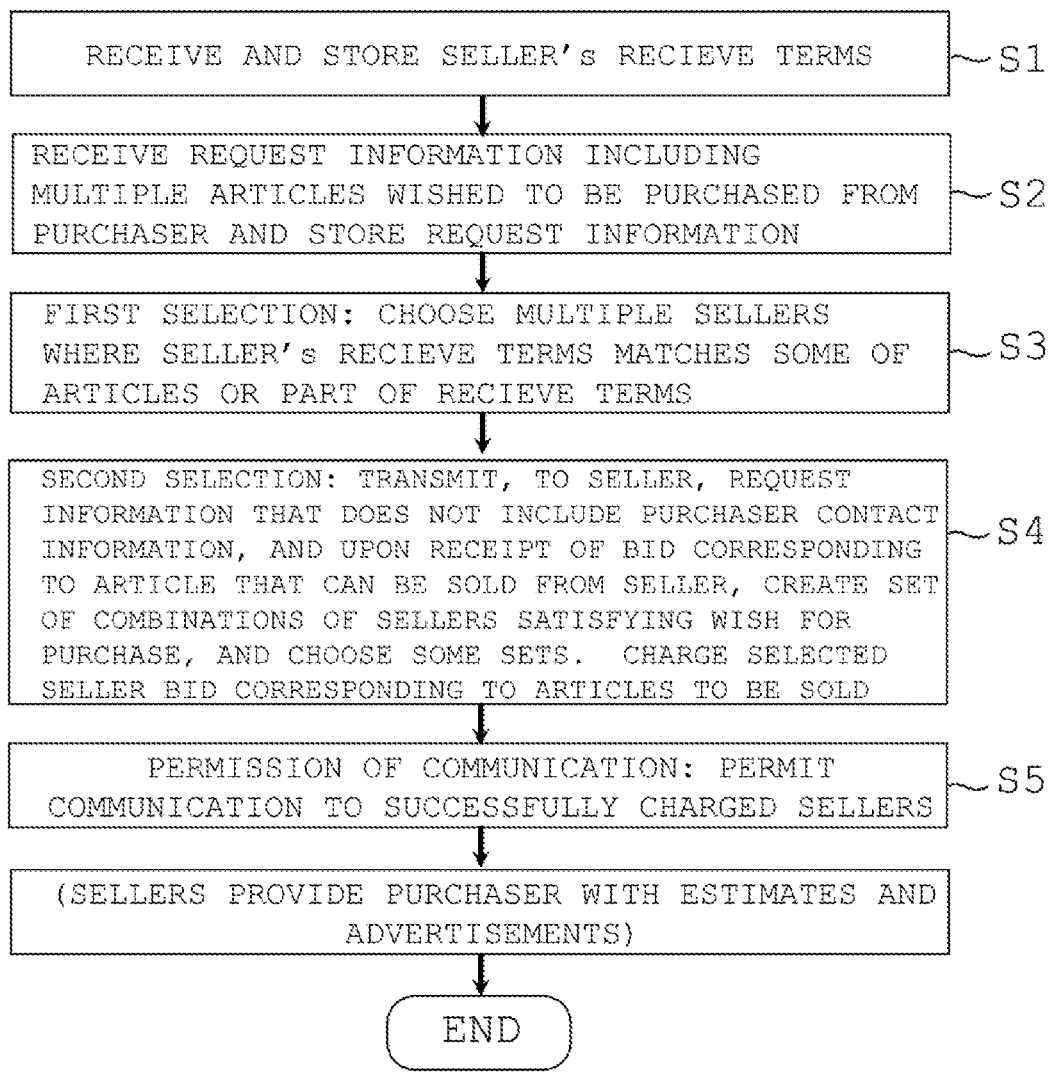
FIG. 18 is a flowchart showing a method of purchasing multiple articles.

In fifth step S5 in FIG. 18, communication between the computer C1 of the selected seller and the computer C2 of the purchaser is permitted, or the purchaser contact information is provided. At this time, the purchaser is provided with information pertaining to the multiple selected sets for sale, and each seller is provided with information pertaining to the articles to be sold.

As to charging the bid, a configuration is effective where when the set for sale is selected from the list of the sets for sale, the bids corresponding to the articles included in the set for sale, and the set for sale only including chargeable sellers are selected. When the multiple sets for sale are presented to the purchaser, a configuration is effective where the amount to be charged is charged by totalizing the bids corresponding to all articles included in the sets for sale selected in the second selection on a seller-by-seller basis. Alternatively, another configuration is effective where even if redundant articles are in the set for sale, the bid for the article is added only one time for charge.

As a method of choosing the seller from the combination of sellers entirely satisfying the articles wished to be purchased, the following methods are considered. The methods may include: a method of choosing the most inexpensive total selling amount as described later; a method of maximizing the bid; a method of giving a priority to a geographical condition for allowing effective shopping; a method of minimizing the amount of emission of carbon dioxide; and a method of allowing fastest availability.

As a result, for example, if multiple small-scale shops in a local shopping area cooperate to satisfy the inquiry, an advantageous effect is exerted that the purchaser can go to shopping and obtain the articles immediately, and no delivery charge is required to allow inexpensive purchase.

Example 14

[Combination of Sellers; without Tendering]
A case of a demand that tendering is not required is analogous to Example 13 except that bids are not received in the second sub-step of fourth step S4-2.

Example 15

[Priority to Total Purchase Amount in Combination of Sellers]
There is also a demand of knowing a combination of sellers allowing the most inexpensive purchase.

In this case, in second sub-step of fourth step S4-2, information indicating the selling amount for each article which the seller can sell from the computer of the seller in a combined manner.

In third sub-step of fourth step S4-3, for each set for sale, the selling amounts of the article included in the set for sale are totalized to calculate the total selling amount. In fourth sub-step of the fourth step S4-4, one or more sets for sale are selected in the list according to the total selling amount.

Here, "according to the total selling amount" may be a method of choosing a predetermined number of sets from the set with the lowest total selling amount. The purchaser is provided with multiple sets of combinations of sellers satisfying wish to purchase, thereby enabling the purchaser to choose a preferable set of combinations. Each seller is provided with information pertaining to the articles to be sold. Such a method enables the purchaser to perform shopping most inexpensively.

A configuration is also effective where the selling amount for each article, a method of calculating the delivery charge, and information pertaining to a transfer fee are received in a combined manner, and the total selling amount in consideration of these items is calculated.

Example 16

[Priority to Total Purchase Amount in Combination of Sellers]
There is also a demand of taking a combination of sellers with the highest total bid.

In this case, in third sub-step of fourth step S4-3 in Example 13, for each set for sale, the total bid obtained by totalizing the bids corresponding to the articles included in the set for sale are calculated. In fourth sub-step of fourth step S4-4, one or more sets for sale are selected in the list according to the total bid.

"According to the bid" may be a method of choosing a predetermined number of sets from the set with the highest bid. Thus, the bid can be maximized.

Example 17

[Designation of Cooperation Partner in Combination of Sellers]
The sellers have a demand that shops in the same shopping area or in the same shopping mall cooperate with each other to satisfy the shopping demand, and a demand that customers visit small-scale shops adjacent to a large-scale shop along with shopping at the large-scale shop.

Thus, a configuration is also effective where information that designates sellers wishing to be combined is received from the computer C1 of the seller and is preliminarily stored in the storing unit 3, the data processing unit 1 gives a priority to designation of the combination of the sellers, and the combination and sellers are selected.

Example 18

[Combination of Sellers in Consideration of Position and Shopping Route]
A configuration is also effective where the storing unit 3 preliminarily stores position information provided by the computer C1 of the seller and the computer C2 of the purchaser via the network, and upon receipt of information indicating a wish about the position of the seller which the purchaser wishes to buy from the computer C2 of the purchaser, the data processing unit 1 combination and selection of sellers are made so that the position of the seller and the shopping route conform to the wish, on the basis of the stored position information.

Here, the position information may be not only text information indicating an address but also information indicating the latitude and longitude.

In specifying the combination in step S4 described above, a method can be considered that totalizing the route along which the purchaser sequentially visits the stores of multiple sellers, and determination is made so that the total of the route is within a range desired by the purchaser, and a method can also be considered that performs distance totalizing that sequentially connects the position of the purchaser and the positions of the stores by lines and totalizes the lines to obtain the slant distance, and makes determination so as to minimize the result of such a distance totalizing.

At this time, when a condition "near the home" is presented as the wish of the purchaser, exclusion of shops apart from home by a predetermined distance from the shops serving as candidates and subsequent execution of the totalization can reduce the computation time.

Furthermore, information indicating a shopping route along which the purchaser is to move actually according to the above combination may be also supplied to the computer C2 of the purchaser, or the navigation system of a car or smartphone owned by the purchaser.

Thus, the sellers to be preferentially combined can be designated. Consequently, combination of the sellers in the same shopping area or neighboring sellers provide better convenience for the purchaser.

On the other hand, the sellers have an advantage that can get customers that are purchasers residing in a geographically neighboring region, and exert an advantageous effect in an event and the like in the shopping area. Local small-scale enterprises can cooperate and participate in trade. Consequently, it can be expected that sales in the area improves, employment improves, and social inequality is alleviated.

Example 19

[Advertisement Information Processing Device that Generates Combined Advertisements]

For example, there is also a demand that the shops in a shopping area wishes to invite customers jointly. There are many shopping areas that hold unique events from season to season to attract customers. For example, in a case of holding an event called cherry blossom festival in a season of cherry blossoms utilizing rows of cherry trees in the shopping area, the advertisement of beauty salons and the advertisements and discount coupons of restaurants belonging to the same shopping area are intended to be combined with photos of night view of the cherry blossoms in the shopping area and be transmitted to the purchaser.

It is difficult for individual sellers to provide such combined advertisements. Consequently, a configuration is also effective that the advertisement information processing device SV2 including the server of the advertising agency shown in FIG. 3 performs an advertisement process.

The advertisement information processing device SV2 includes the storing unit 21, and the advertisement information processing unit 21. The advertisement information processing unit 21 is connected to the data processing unit 1 included in the trade information exchange device SV1 and the computer C1 of the seller.

The storing unit 21 preliminarily stores advertisement information for each article or the like supplied from the computer C1 of the seller. The advertisement information includes not only text data that describes the specifications, instructions and the like of articles and the like, but also image data and moving image data obtained by taking images of coupons and articles.

Here, when the purchaser wishes multiple articles and the like, the advertisement information processing unit 22 receives a set of combinations of sellers and articles from the trade information exchange device SV1, and reads, from the storing unit 21, corresponding pieces of advertisement information on an article-and-article basis, combines these pieces, and transmits the combined information to the computer C2 of the purchaser.

At this time, not only advertisements of articles and the like but also advertisements common to the sellers, such as a guide of an event of viewing the cherry blossoms in the shopping area, are inserted, which has high customer appeal.

If attribute data on the purchaser, that is, attribute data that indicates the gender, age, the usage history of the purchase candidate, another purchase history, keyword histories of other users and the like is preliminarily stored in the storing unit 21, and when advertisement information is generated, the attribute data is referred to and the combination target data is selected, combined advertisement information further matching the need of the user can be provided with respect to articles and the like which a user of the computer C2 of the purchaser wishes to buy.

A configuration is also effective where this advertisement information processing device SV2 is embedded in the trade information exchange device SV1, allowing the advertisement to be transmitted automatically from the trade information exchange device to the computer of the seller every permission of communication.

As described above, for example, the advertisement information processing device SV2 is managed and operated by the advertising agency, high-quality advertisement information generated by the advertising agency is stored in the storing unit 21, thereby allowing the seller to provide the purchaser with the high-quality advertisement information at low cost.

For example, in response to the inquiry "I wish to go to a beauty salon, see a friend and have a meal.", a combination of the advertisement of the beauty salon and advertisement and coupon of the restaurant belonging to the same shopping area and the photo of rows of cherry trees in full bloom is considered. A configuration is also preferable where a reservation button is added on the screen of the advertisement, the name and the number of reservations can be grasped by the seller.

Example 20

[Occurrence of Charging of Bid at Time of Trade Establishment]

Charging of the bid is made before permission of communication as described above. There is a problem that if a person in the guise of purchaser transmits request information without intention of purchase, the seller is charged the bid every time of the transmission.

To prevent it, a configuration is also effective where when any of the purchaser and the seller notifies the trade information exchange device SV1 of the conclusion of trade, the bid is charged. Such a method is also effective in a case of trade conclusion through telephone. Charging at the time of the settlement unit 7 executing the settlement process is further convenient.

Example 21

[Automatic Tendering]

Figure 20:
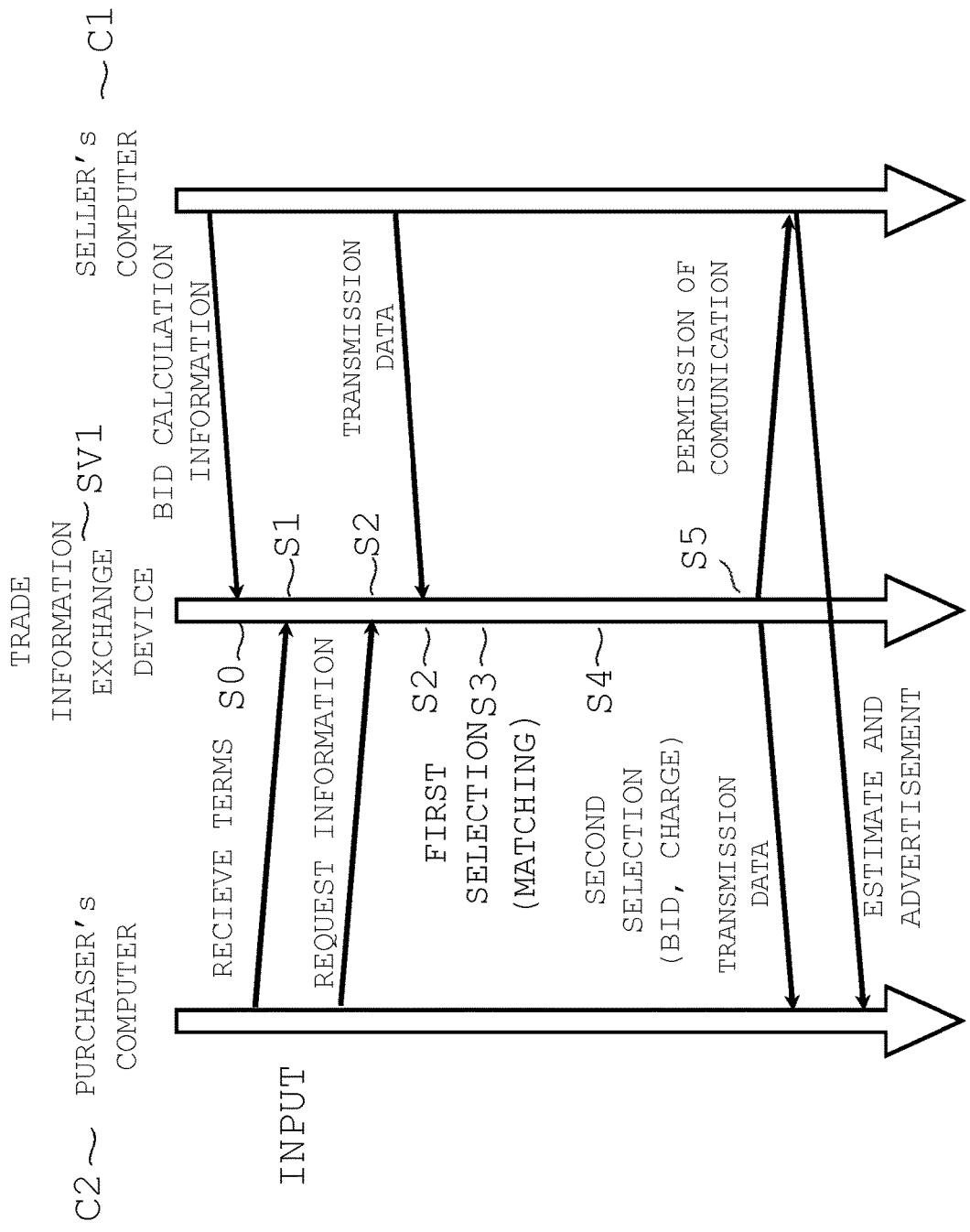
FIG. 20 is a sequence diagram showing an automatic tendering method.

As to the bid presented by the seller, instead of the method of transmitting request information of the seller or reception condition that does not include the purchaser contact information to the computer of the seller, as shown in FIG. 20, in step 50, bid calculation information that includes the bid, budget for bid, stock information on the seller, sourcing cost such as purchasing price, material cost, processing cost, service providing cost, and labor cost which represent the cost, or a calculation expression for the bid is preliminarily stored in the storing unit 3, and in fourth step S4, the data processing unit 1 may calculate the bid on the basis of the bid calculation information, and automatically make a bid.

The computer of the seller may preliminarily transmit the bid calculation information, or transmit the information together with the transmission data and the seller's receive terms.

Every time the purchaser obtains an estimate, the seller is required to pay the bid. Consequently, even though the purchaser frequently obtains estimates but does not buy, the bid of the seller is useless. Furthermore, a purchaser that maliciously or mischievously obtains an estimate can also be assumed.

Thus, to take measures against such a mischievous conduct, purchase achievements that indicate the frequency of purchase in the past is additionally considered in a request for an estimate issued by each purchaser, and the bid for a frequent-purchasing purchaser is calculated to be high while the bid for a not-frequent-purchasing purchaser is calculated to be low, thereby preventing useless bids.

A configuration is also effective where the storing unit 3 stores the number of receptions and the number of purchases of request information as purchase achievements, and instead of the second selection the data processing unit 1 performs another second selection where the data processing unit 1 calculates the bid according to the request information, information specifying the article included in the reception condition or the transmission data, bid calculation information, and the ratio of the request information to the number of receptions in the purchase achievements, adopts the calculated value as the bid, and choose one or more sellers.

For example, with respect to the selling amount and the predetermined bid ratio (e.g., 2%), the following calculation expression can be considered. Here, the purchase ratio of the purchaser is the ratio of the number of purchases to the number of receptions of request information.

bid=selling amount×bit ratio×purchase rate of purchaser　　　[Formula 1]

The method as described above can reduce the risk that the seller pays the bid to a purchaser with insufficient purchase achievements and a purchaser that maliciously or mischievously obtains an estimate.

For the seller, the possibility of trade conclusion depends on the number of sellers selected as a result of tendering. A configuration is also effective where the number of sellers selected as a result of tendering is additionally considered in calculation of the bid. A configuration where if the number of sellers is small, the bid is increased, and if the number is large, the bid is reduced can reduce the risk of uselessly paying the bid.

Furthermore, a configuration is also effective where the purchaser is allowed to write whether the purchaser asking the price only by an interesting or asking seriously, and the result is converted into numbers, and when the intention of purchase is strong, the bid is calculated high.

Example 22

[Tendering Device that Performs Automatic Tendering]
The tendering in the above description may be automatic tendering by the tendering device SV3 shown in FIG. 4.

That is, the storing unit 31 receives the bid calculation information from the computer C1 of the seller and stores the information. The tendering processing unit 32 receives the transmission of request information transmitted by the purchaser from the trade information exchange device SV1, calculates the bid according to information specifying the article included in the request information and the bid calculation information stored in the storing unit 31, and holds the tendering. Upon receipt of communication selected as the seller in the trade information exchange device SV1, the receipt is notified to the computer C1 of the seller.

Here, more specifically, it is assumed that the tendering device SV3 is computers of the seller, sales agent, and advertising agency or the like, but not limited to them.

It can be considered that the tendering processing unit 32 calculates the bid by the bid calculation method described above.

Example 23

[Automatic Estimate]
The storing unit 3 included in the trade information exchange device SV1 may further store estimate amount calculation information that includes the selling amount for each article supplied from the computer C1 of the seller, the sourcing cost, or the selling amount calculation expression, and the data processing unit 1 may calculate the estimate amount including the total amount according to the request information received from the computer C2 of the purchaser and the estimate amount calculation information supplied from the computer C1 of the seller permitted to communicate, and transmit the amount to the computer C2 of the purchaser.

As this automatic estimate calculation, a method can be considered that calculates the estimate amount according to the purchasing price supplied by the seller, desired profit margin, and the purchase ratio of resultant purchase from multiple estimates stored in the storing unit 3. Here, for example, in a case where the amount obtained by multiplying the purchasing price by a coefficient in proportion to the profit margin and the purchase ratio is adopted as the estimate amount, when the past purchase ratio is low, the estimate amount is also low. Consequently an advantageous effect is exerted that improves the purchase ratio.

A configuration is also effective where this automatic estimate calculation is implemented in the tendering device described above, the computer C1 of the seller or the computer of the advertising agency automatically performs both of tendering and submitting an estimate.

Example 24

[Affiliate that is Writer of Bulletin Board]

Example 25

[Shopping Processing Device of Affiliate that is Writer of Bulletin Board]
[First Shopping Processing Method]
The trade information exchange device, such as the server SV1 described in FIG. 2, has a an object to improve the number of purchasers transmitting request information, and effectively create the request information including keywords, such as the names of articles, for allowing the purchaser to transmit the request information easily. Thus, means for allowing the purchaser to transmit request information by one click using an affiliate system is provided.

In general, the affiliate system is a method where an operator of a blog or the like, called an affiliate, embeds an affiliate link (a long URL to which the identification information of an article is embedded) provided by the seller into a webpage. This mechanism is as follows. When a reader of the blog clicks the link, a purchase page for the article of the seller serving as an affiliate provider is displayed. If the reader purchases the article, the seller or the advertising agency pays the affiliate a reward for success.

According to a typical affiliate system, only the operator of a web page can embed an affiliate link in the webpage. On the contrary, the present invention provides a method of allowing not only the operator but also a normal user (reader) to embed affiliate information in a reader-participatory bulletin board, SNS, a comment field in a blog, and additional information in a moving image, and to obtain an affiliate reward. The method is also applicable to a webpage advertisement, a digital newspaper, a magazine advertisement, an application and the like. In the case of an application, the affiliate is a developer, and the viewer is a user of the application.

Hereinafter, an embodiment of the first shopping processing method of the present invention is described in detail with reference to the configuration diagram of FIG. 5 and sequence diagram of FIG. 21. Here, in a specific example, the shopping processing device SV4 also serving as a web server provides a reader-participatory bulletin board, an affiliate that is a viewer of the bulletin board uses the computer C4, and the purchaser uses the computer C2. The shopping processing device SV4 cooperates with the trade information exchange device SV1. The computer C1 of the seller cooperates with the trade information exchange device SV1. The bulletin board is only an example. Alternatively, display of an magazine article and an advertisement, display of moving images, or any display in an application is also adopted.

Figure 21:
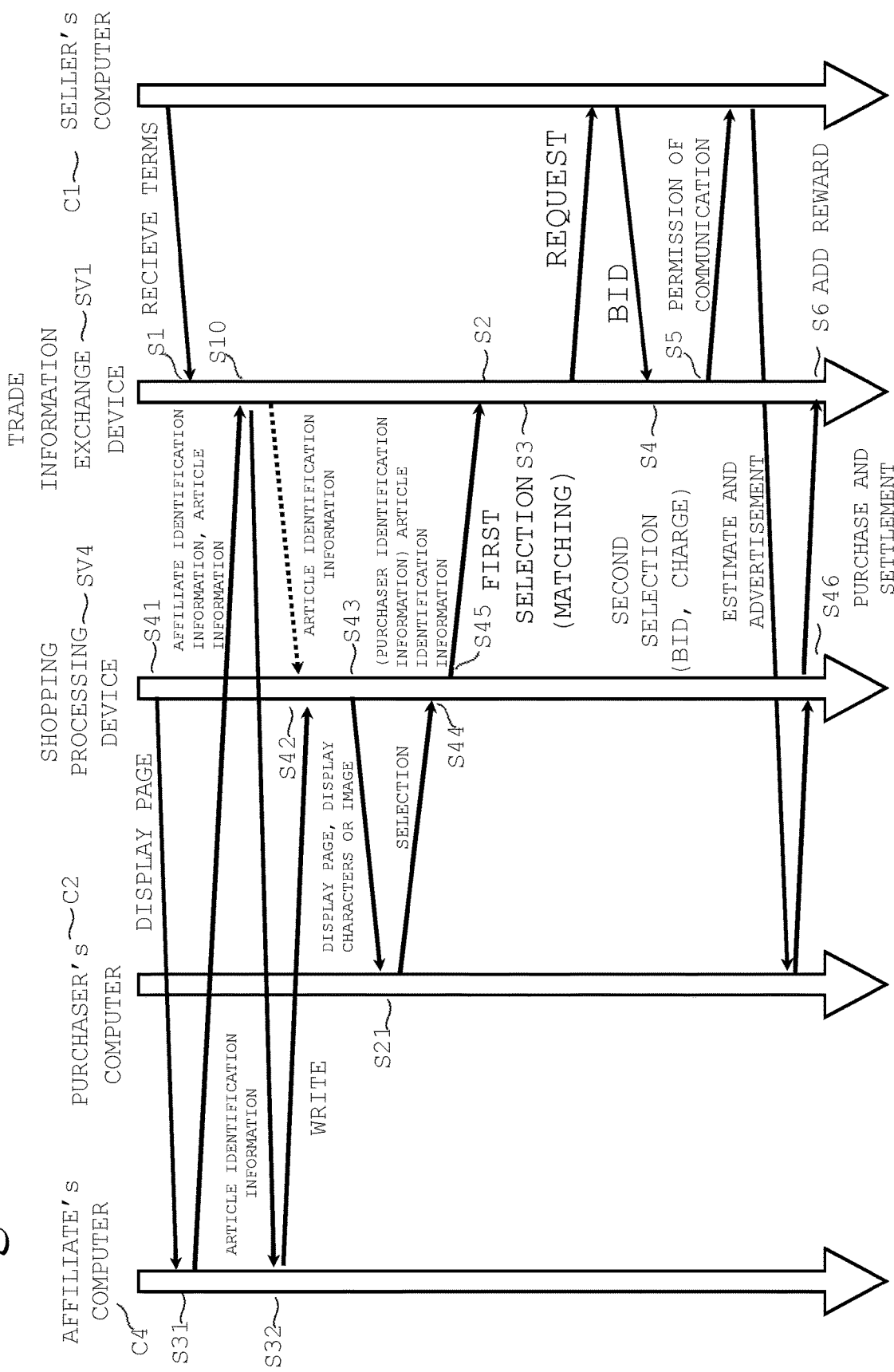
FIG. 21 is a sequence diagram showing an affiliate method that is a shopping processing method.

As shown in FIG. 21, the shopping processing method using the affiliate system according to the present invention includes communication procedures between the five configuration elements.

In step S1 of the trade information exchange device SV1, the data processing unit 1 preliminarily causes the storing unit 3 to store the reception condition transmitted from the computer C1 of the seller.

In step S41, the shopping processing device SV4 displays the bulletin board for the affiliate C4. In the example of the bulletin board shown in FIG. 22, a comment 103 having been written by another viewer is readable. Here, the affiliate C4 intends to write his or her comment and embed affiliate information on an article "HAL9000 of XX company".

In step S31, the affiliate C4 transmits the name of the article "HAL9000 of XX company" or the article code and his or her identification information, to the trade information exchange device SV1. The identification information is, for example, the account name of the affiliate.

In step S10, the data processing unit 1 of the trade information exchange device SV1 generates temporary article identification information (e.g., 19920112) from the name of article HAL9000 of XX company and the identification information on the affiliate, and causes the storing unit 3 to store the information. Furthermore, the information is transmitted to the affiliate C4.

Figure 22:
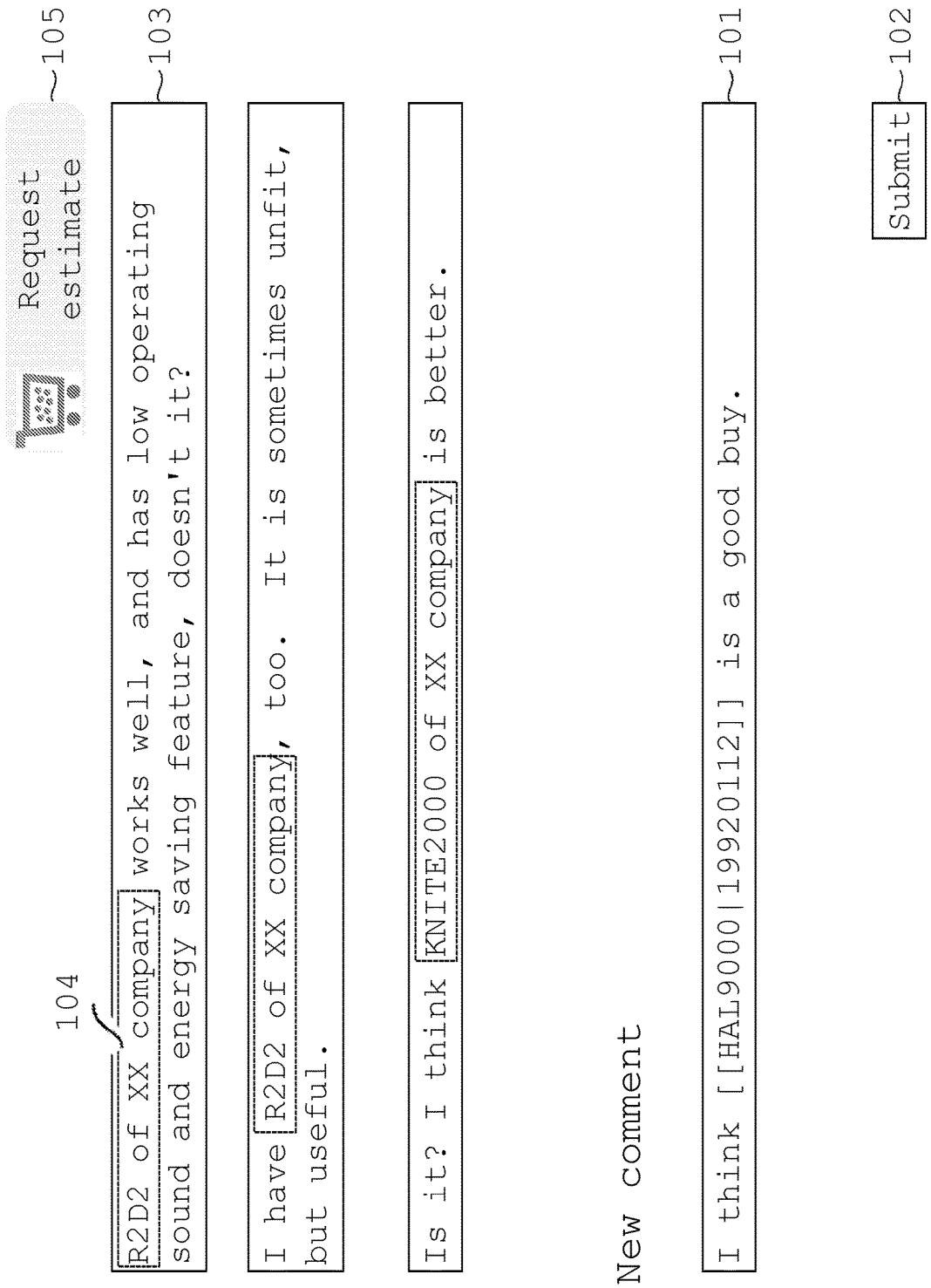
FIG. 22 is a diagram showing an example of affiliate in a bulletin board.

In step S32, when the affiliate C4 writes text into a transmission form 101 for a new comment in FIG. 22, he or she embeds affiliate information, for example, [[character string|article identification information]], and presses a transmission button 102. Here, "character string" is the name of an article to be displayed or an image.

The input of the affiliate information by the inputting party may be according to such a method of adding annotated characters. Alternatively, the method may be a method of executing an input decoration function through inputting an editing button. Alternatively, the method may be a method of causing the affiliate C4 to retrieve a list of article information and automatically inputting the corresponding article identification information, instead of step S31 described above, a method of adding the affiliate information to an article displayed in a digital newspaper or magazine, or a method of adding the affiliate information to a scene that is displayed in a moving image and corresponds to the article.

In step S42, the storing unit 41 of the shopping processing device SV4 stores the written comment. The procedures may be procedures of obtaining the article identification information directly from the trade information exchange device SV1.

Next, when a different viewer, that is the purchaser C2 views this bulletin board in step S21, the stored bulletin board is read from the storing unit 3 of the shopping processing device SV4 and displayed in step S43. At this time, text information or image information input by the affiliate C4 is displayed in a selectable (clicking, tapping) state. Reference numeral 104 in FIG. 22 denotes another example of selectable affiliate information.

When the purchaser C2 that wishes to know the price of an article chooses the affiliate information, the article identification information is transmitted.

In step S44, the purchase processing unit 42 of the shopping processing device SV4 receives the article identification information.

In step S45, the purchase processing unit 42 of the shopping processing device SV4 transmits the article identification information and the identification information on the purchaser C2 to the trade information exchange device SV1.

In second step S2, the data processing unit 1 of the trade information exchange device SV1 receives the article identification information, and searches for the article and affiliate C4 stored in step S10, using the information. The third step S3 to fifth step S5 described above are executed with the information pertaining to the article being adopted as the request information.

In step S46, in a case of conclusion of trade, the purchase processing unit 42 of the shopping processing device SV4 performs the settlement process, or transmits the intention for purchase of the purchaser to the trade information exchange device SV1 or the computer C1 of the seller.

In step S6, the data processing unit 1 of the trade information exchange device SV1 causes the reward unit 9, which executes a reward process, to execute the reward process for the affiliate C4 every time of occurrence of permission of communication, or every time of conclusion of trade.

Among the steps described above, steps pertaining to the trade information exchange device SV1 is Example 24, and steps pertaining to the shopping processing device SV4 is Example 25.

Here, a configuration of displaying the market price or recommendation in a case of choosing the affiliate information, a configuration of learning keywords in a webpage, automatically performing marking, and installing the affiliate information, a configuration of allowing conditions, such as desired delivery time and delivery method to be added, a configuration of receiving the identifier of the operator of the blog or bulletin board and distributing the affiliate reward, and a configuration of receiving an advertisement corresponding to a keyword can be considered. These configurations can be achieved by an application in addition to the web system.

This allows a large number of normal readers different from the operator of the blog or bulletin board to create the request information effectively, and allows the affiliate reward to be obtained. An advantageous effect is exerted that the article can be purchased only selecting characters or an image displayed on the bulletin board or the like by many readers reading it.

For the operator of the bulletin board or blog, the need to provide an advertisement space, an affiliate banner or link on the screen of the bulletin board as in a conventional case is negated. Consequently, an advantageous effect of displaying the content on the screen in a clear and beautiful manner.

It can be considered that the affiliate C4 performs clicking by himself or herself to obtain a reward (self-clicking). An advantageous effect of taking measures against fraud or the like using HTTP cookies is also effective.

Example 26

[Virtual Shopping Cart Encompassing Sites]

In the affiliate system described above, there is also an object for inquiry of estimates pertaining to multiple affiliate target articles displayed on multiple bulletin boards operated by different operators, at one time.

Thus, the storing unit 3 of the trade information exchange device SV1 is provided with a shopping cart. In FIG. 2, this cart is indicated as the shopping cart 8.

When the purchaser chooses a character string or an image indicating the article, the purchase processing unit 42 of the shopping processing device SV4 transmits the identification information on the purchaser and the article to the trade information exchange device SV1, and adds the article identification information to the shopping cart 8 of the trade information exchange device SV1.

Here, the identification information on the purchase means account information, HTTP cookies, an user identifier of the application and the like, and enables one purchaser to choose article information in each of pages operated by different operators and add the information to an estimate cart corresponding to the purchaser. At this time, it is preferable that purchase conditions pertaining to services, such as the quantity, delivery time, installation, and guidance, can be designated.

When the purchaser presses an estimate request button 105 in FIG. 22 after adding the article to the shopping cart 8, the purchase processing unit 42 of the shopping processing device SV4 transmits request information indicating that the estimate request button 105 is pressed to the trade information exchange device SV1, thereby allowing start of a trade information exchange process pertaining to multiple articles having already been added to the shopping cart 8.

Example 27

[Shopping Device]

Figure 23:
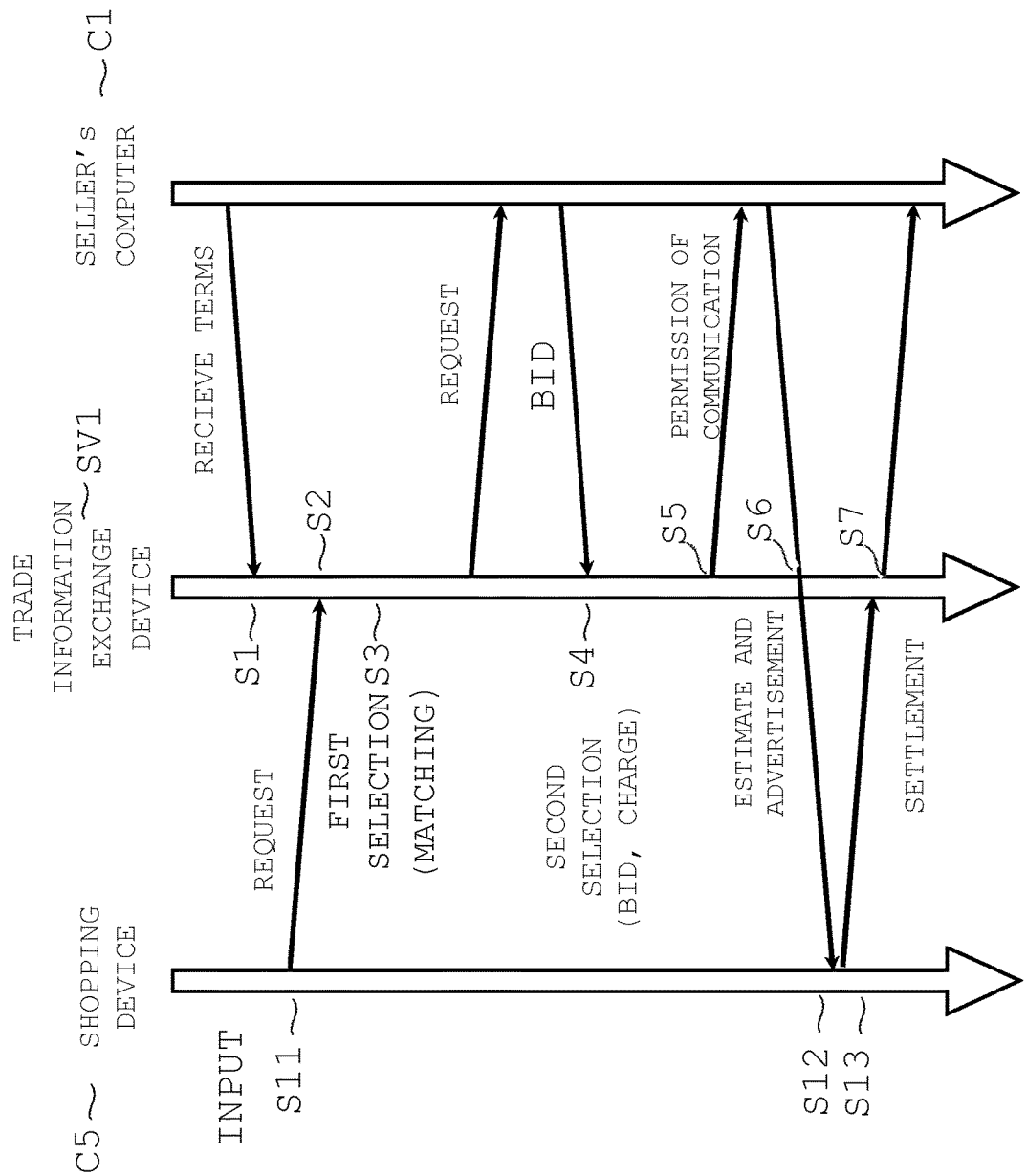
FIG. 23 is a sequence diagram showing a shopping method.

The computer C2 of the purchaser using the trade information exchange method described above is required to support a special processing scheme of the trade information exchange method. Such a computer C2 is referred to as a shopping device. It can be considered that this device is configured as the shopping device C5 that is a terminal of the purchaser shown in FIG. 6 in a certain case, while being configured as a server as with the shopping processing device SV4 in FIG. 5 to provide services as with the shopping processing device SV4 in another case. Hereinafter, a shopping method according to an embodiment of the present invention is described with reference to a sequence diagram of FIG. 23.

In step S11, the purchase processing unit 52 of the shopping device C5 or the purchase processing unit 42 of the shopping processing device SV4 transmits the request information indicating an article wished to be purchased and input by the purchaser, the purchase condition and the like to the trade information exchange device SV1. Note that description of the article, a photo, article identification information and the like may be preliminarily received from the trade information exchange device SV1, and presented to the purchaser, and subsequently transmitted to the trade information exchange device SV1.

In step S12, the purchase processing unit 52 or the purchase processing unit 42 receives multiple pieces of purchase condition information for the purchase target from the computer C1 of the seller or the trade information exchange device SV1. The purchase condition information includes information on the delivery time, purchase amount, advertisement and the like.

In step S13, the settlement unit 51 or the settlement unit 43 transmits information indicating an intention for purchase to the trade information exchange device SV1 or the computer C1 of the seller, or executes the purchase amount settlement process.

As described above, a behavior of the purchaser, such as tapping or clicking of an advertisement of a digital newspaper or magazine, scanning of an article code accompanying an advertisement of a newspaper or magazine, or input of text or a photo pertaining to a desired article allows multiple estimates to be obtained and allows purchase from a sellers of selection.

A configuration is also effective that includes purchase target information extracting means for extracting information indicating the article wished to be purchased by applying natural language processing or speech and image processing to text information, speech information or image information input to the computer by the purchaser. A configuration is also effective where a developer of the shopping device receives, as a reward, a part of the purchase amount or the bid.

Example 28

[Shopping Device with Natural Language]
[Second Shopping Processing Method]

In an speech input terminal shown in Non Patent Literature 3, the name of an article input through speech by a purchaser is transmitted to a server, and added to the shopping cart on the web. Subsequently, the purchaser opens a shopping cart on the web using a personal computer, confirms the names and amounts of individual articles, and the total amount, and places an order. The number of presentations of the total amounts is only one from the operation company. There is a demand that the selling prices of multiple sellers are compared to achieve shopping at an advantageous conditions.

To achieve an object to provide a method of receiving multiple estimates only by speaking a desired article through a smartphone, or by taking photos, choosing a preferable estimate and purchasing the article, another method is provided that is closely related with respect to the technical significance.

Figure 24:
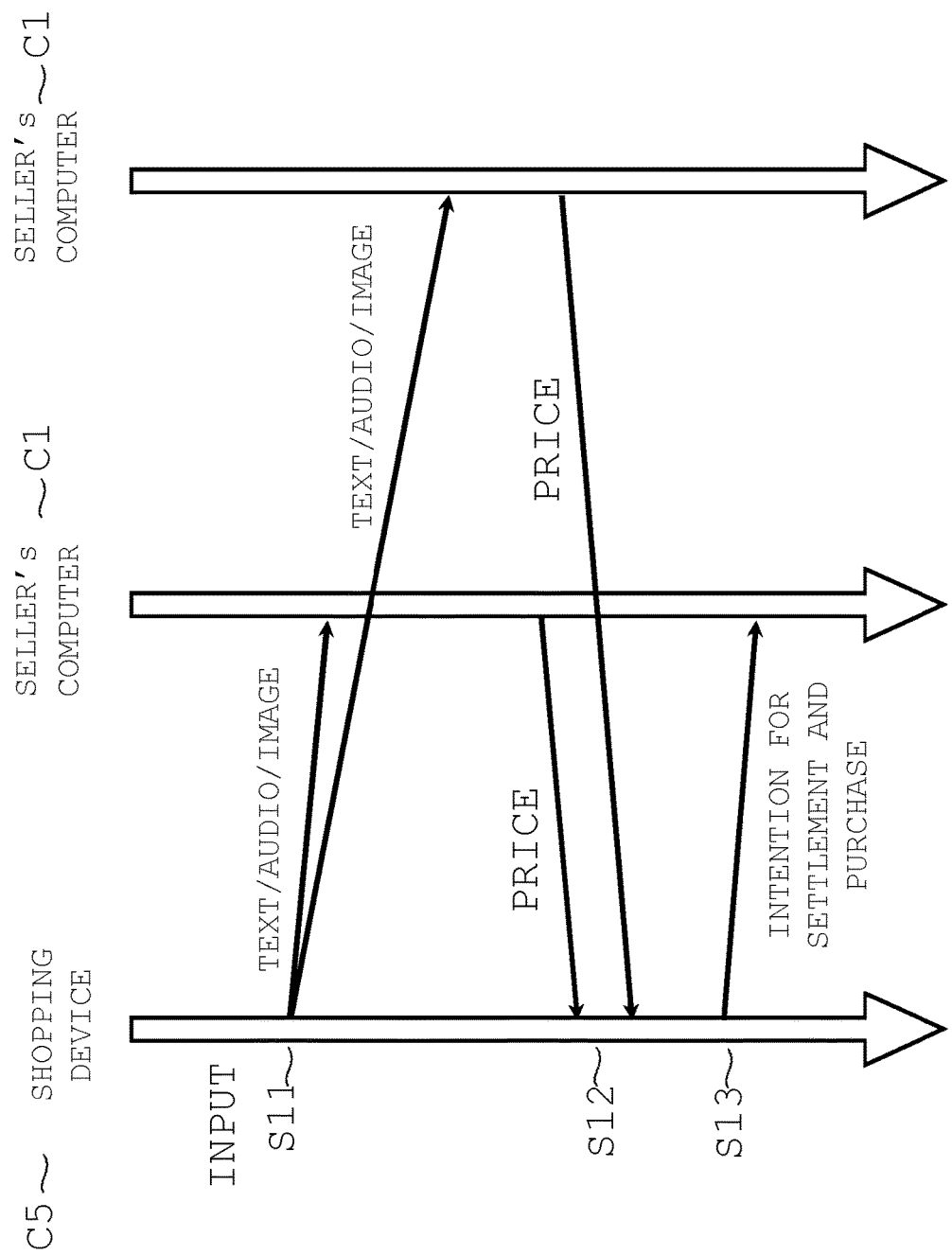
FIG. 24 is a sequence diagram showing a shopping method.

Hereinafter, referring to FIG. 24, the second shopping method according to an embodiment of the present invention by the shopping device C5 shown in FIG. 6 is described in detail. This shopping method receives multiple estimates only by speaking a desired article through a smartphone or by taking photos, chooses a preferable estimate and purchases the article, but directly communicates with the computer C1 of the seller or the agency without intervention of the trade information exchange device SV1. Alternatively, as with the shopping processing device SV4 in FIG. 5, a configuration may be adopted where implementation is made as a server and services are provided for the terminal of the purchaser.

In step S11, the purchase processing unit 52 of the shopping device C5 transmits the request information including an article wished to be purchased and input by the purchaser, the purchase condition and the like to the multiple computers C1 of the sellers.

In step S12, the purchase processing unit 52 receives the purchase condition information from the computer C1 of the seller or the agency. The purchase condition information includes information on the delivery time, purchase amount, advertisement and the like.

In step S13, the settlement unit 51 transmits information indicating an intention for purchase to the computer C1 of the seller, or executes the purchase amount settlement process.

As a method of choosing the seller in the above description, a configuration can be considered that registers many sellers and uses a server selectable from the list. Alternatively, a method can be considered that performs selection in consideration of the past purchase achievements of the purchaser, the purchase achievements of other people, an evaluation of the seller, an ascending order of the selling amount, an order of popularity, presence or absence of stocks, the purchase condition and the like.

In the above description, there are a configuration where if the natural language processing or speech and image processing is required, the process is executed by the shopping device C5, a configuration of execution in a third server, not shown, and a configuration of execution in the computer C1 of the seller.

As the settlement process, a configuration is effective that accepts information indicating the intention for purchase by the purchaser after receipt of the selling amount and subsequently allows settlement, and a configuration is also effective that automatically performs purchase according to a predetermined condition, such as the degree of purchase amount, without confirmation of the intention for purchase of the purchaser.

The shopping device C5 of the present invention exerts an advantageous effect that enables the purchaser to choose the seller preferred with respect to the selling condition and the total amount, and an advantageous effect that enables the seller to increase the opportunity of participating various sales.

Example 29

[Shopping Support Robot]
In a case where the shopping device is configured as a robot C6, this robot makes shopping arrangements for the purchaser near him/her and is thus significantly convenience.

Example 30

[Shopping Support Vehicle]
In a case where the shopping device is configured as the vehicle C7 in FIG. 6, the vehicle supports shopping when the purchaser get on the vehicle to go shopping, and is thus significantly convenient.

Embodiments in a case of application to the trade information exchange device and the advertisement information processing device, and the trade information exchange method according to the present invention have thus been described. Furthermore, the present invention is also applicable not only to trade of articles, but also to, for example, use of the computer C1 of the seller by a travel agency and use of the computer C2 of the purchaser by a traveler.

In this case, the travel agency causes the storing unit 3 to store preliminarily a destination and the like of a tour which the agency wishes to provide as information indicating the reception condition, and the traveler transmits, as request information, the destination which the traveler wishes to the trade information exchange device SV1, thereby allowing the traveler to determine efficiently the tour in which he or she participates with the travel agency having an advantage in the destination concerned.

Furthermore, the present invention is also effective in a case where, for example, the computer C1 of the seller is used by a job recruitment agency and the computer C2 of the purchaser is used by a job seeker.

In this case, the job recruitment agency causes the storing unit 3 to store preliminarily, for example, a salary and the like which the agency presents, and the job seeker transmits, as request information, the labor condition which the he or she wishes to the trade information exchange device SV1, thereby allowing the job seeker to determine efficiently the place of employment which he or she wishes through the job recruitment agency which presents the labor condition which the job seeker wishes.

Example 31

[Shopping Processing Method of Purchasing Article During Moving Image Viewing]
[Shopping Method (Terminal Side) of Purchasing Article During Moving Image Viewing]

Conventionally, there is a problem in that even if the purchaser watches a fascinating article in a television program or a commercial (CM) and thinks "Lovely! I want it" (furthermore, a telephone number or a search keyword is displayed), he or she forgets after a lapse of time. There is also a demand of an intention to purchase immediately an article shown in a television program, commercial or streaming moving image through a significantly simple operation while viewing the television program, commercial or streaming moving image.

Conventionally, it is difficult to input personal information, such as an address, required to purchase an article using a remote control accompanying a television. Accordingly, a method of purchasing an article in a commercial is not widespread. Only a part of such a method is allowed in digital broadcast on an optical network capable of specifying the personal information on a purchaser. Currently, there are many cases where a smartphone is also activated while the purchaser views the television. Electrical appliance manufacturers provide applications that facilitate text input with smartphones serving as keyboards for a television. It is easy that a smartphone communicates a television or a server to transmit personal information.

However, if the number of presented prices is only one such "Provided for just XX yen, Oh!" as with conventional home shopping programs, mentality such "It is buyable more inexpensively at a neighboring shop or shopping site, isn't it?" sometimes prevents purchase.

Thus, there is also a demand that in response to presentation of multiple estimate prices, purchase is made with understanding of the estimate prices. Alternatively, there is a demand that in response to provision of a discount coupon from a manufacturer providing commercials, purchase is to be made at a later date.

Figure 25:
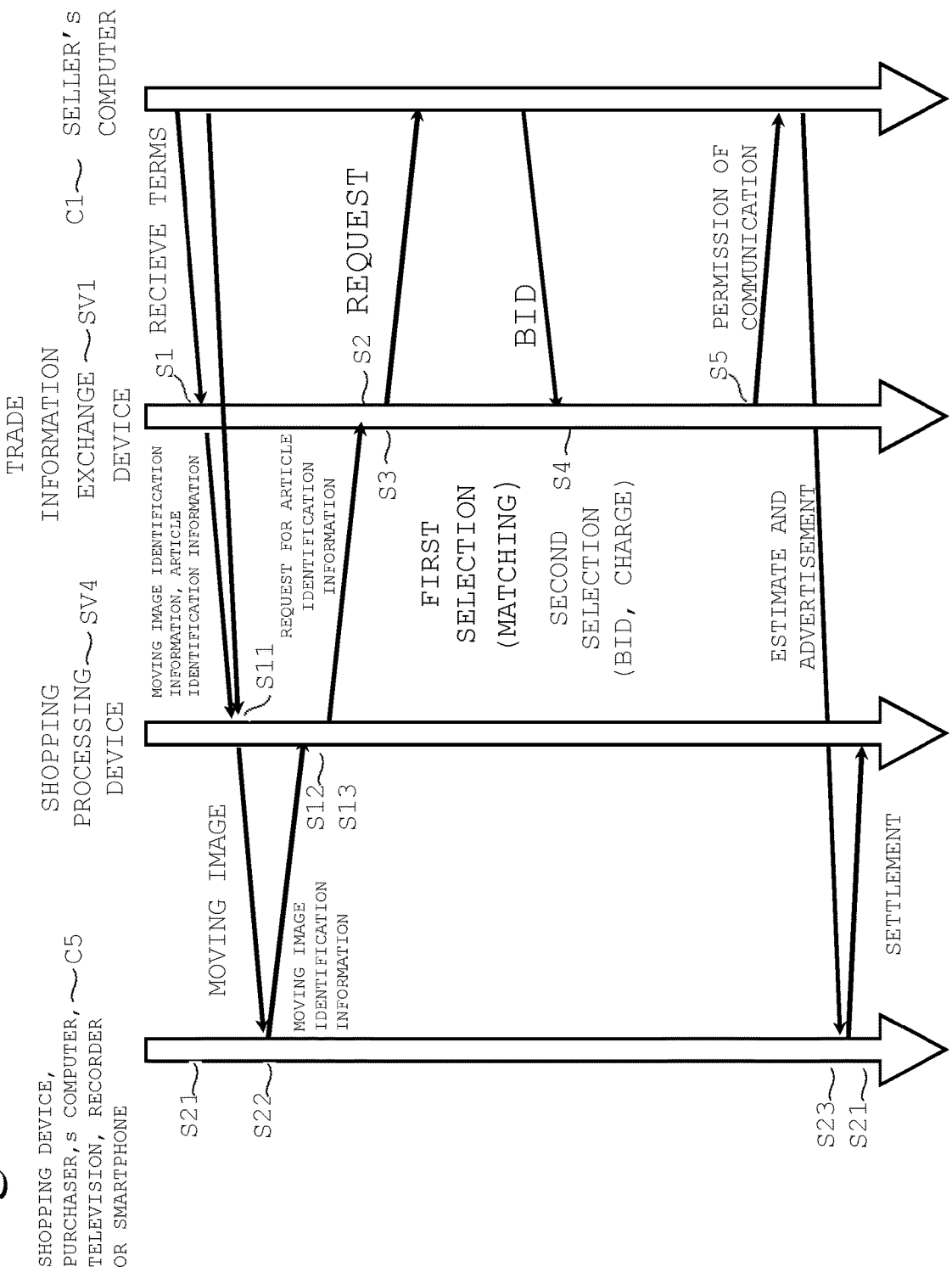
FIG. 25 is a sequence diagram showing a shopping method during viewing of moving images.

Under such assumptions, a method of purchasing an article while viewing television or a moving image site with respect to the configuration diagrams of FIGS. 5 and 6 and the sequence diagram of FIG. 25.

A computer C2 or the shopping device C5 used by the purchaser may be assumed as any of modes including a television receiver, a recorder such as a BD recorder, a smart television adaptor, a smartphone and a tablet, or a mode of a combination thereof. Here, as an example, the shopping device C5 in a form with a television and a smartphone is assumed. However, the mode is not limited there to only if the device allows an moving image to be viewed.

As the shopping processing device SV4, a server of a moving image site that provides moving images for the purchaser, a server of a broadcasting station, or a server of an advertising agency are assumed. Note that the configuration where the trade information exchange device SV1 also serves as the shopping processing device SV4 and processes shopping through moving images, and the moving image identification information are described in Example 1 and paragraph 0072. The following description includes issues common to those of Example 1.

The seller or the advertising agency preliminarily receives, from the broadcasting station or the moving image distribution site, moving image identification information pertaining to moving images provided by the own company, or moving images where a product of the own company is imaged.

In first step S11, the purchase processing unit 42 of the shopping processing device SV4 receives a set of the moving image identification information on a certain moving image and article identification information for identifying an article to be sold in accordance with the moving image, from the computer C1 of the seller or the advertising agency or the trade information exchange device SV1, and causes the storing unit 41 to store the set. That is, the seller registers, in the shopping processing device SV4, information that associates the moving image broadcast at a certain date and time at a certain channel or a moving image distributed through a specific URL with the article to be sold. The moving image is not necessarily a moving image provided by the seller itself. Alternatively, it is assumed that many sellers registers many sets as described above.

In step S22, when the purchaser wishes an article shown in a moving image during viewing, he or she presses a predetermined remote control button. The purchase processing unit 52 of the television C5 then transmits the moving image identification information on the moving image shown at the time, to the shopping processing device SV4. Alternatively, upon pressing of a predetermined button of an application of the smartphone C5, the purchase processing unit 52 of the smartphone C5 transmits the moving image identification information on the moving image shown at the time to the shopping processing device SV4.

In step S12, the purchase processing unit 42 of the shopping processing device SV4 receives the moving image identification information from the television C5 or the smartphone C5. Furthermore, the storing unit 41 is searched to specify the article identification information corresponding to the received moving image identification information.

In step S13, the purchase processing unit 42 of the shopping processing device SV4 transmits the specified article identification information, as the request information issued by the purchaser, to the trade information exchange device SV1. Hereinafter, the description is analogous to that of the shopping method and the trade information exchange method described above. The method through automatic tendering and automatic estimate is preferable because of quickness.

In step S23, the purchase processing unit 52 of the television C5, smartphone C5 or the like of the purchaser receives purchase information, that is, multiple estimate information, a discount coupon, an advertisement and the like, from the seller C1 or the like. Then, the purchase information is presented to the purchaser, and selection is accepted. In cases of some types of selection, the purchase process may be executed using the settlement unit 51.

Input of the personal information on the purchaser, such as an address, required for purchase may be made in step S21 or in a stage of settlement, or supplied from the smartphone C5, input from the remote control of the television C5, or be made according to another method.

Among the steps described above, steps pertaining to the shopping processing device SV4 is the shopping processing method, and steps pertaining to the shopping device C5 is the shopping method.

Note that in step S22, the predetermined button is pressed when the purchaser wishes to know the purchase information on the article shown in the moving image. However, if timing is delayed, the purchase information on an article in a subsequent commercial. In step S22 or S23, a configuration is effective where buttons "Prev. article" and "Next. article" and a scroll display are provided, and articles sequential on the temporal axis of broadcast are provided, thereby allowing the purchaser to specify an article.

Alternatively, a configuration is also effective that sequentially displays article choosing screens corresponding to scenes during viewing of the moving image, and executes the procedures by the purchaser's selection of the article.

If the seller C1 cannot obtain moving image identification information from the broadcasting station, a method of allowing the shopping processing device SV4 to transmit the broadcasting date and time to a server of the broadcasting station, not shown, and to receive the corresponding moving image identification information, and a method of allowing a receiving party to upload the moving image identification information and the article information on a bulletin board or the like on a network every time of broadcasting according to the crowdsourcing method and of specifying the article on the basis of the channel and the broadcasting date and time are also effective.

There is also a demand of choosing an article from among articles shown in one moving image and of purchasing the article.

In this case, the following mode is also effective, that is, in step S11, furthermore, receives the time from the start of the moving image and the article identification information on an article to be sold in accordance with the time, and causes memory means to store the information; in step S12, furthermore, the time from the start of the moving image is received, and the article identification information corresponding to the time is specified; and in steps S13 and thereafter, processes analogous to those in the above description are executed.

For example, during five to ten seconds from the start of a certain moving image, in correspondence with the advertisement of an article A, information on correspondence relationship indicating an advertisement of an article B in 10 to 15 seconds is preliminarily received and stored. When the purchaser views the moving image and performs an operation that instructs an estimate at a time point in eight seconds, a time of eight seconds is received and the article A is specified.

Furthermore, there is also a demand of choosing an article from among articles shown in one scene in one moving image and of purchasing the article.

In this case, the following mode is also effective, that is, in step S11, furthermore, position information in an image frame at a certain time in the moving image and the article identification information on an article to be sold in correspondence with the time and the position information are received and memory means is caused to store the information; in step S12, furthermore, the position information on the article which the purchaser wishes to purchase and which is in the image is received, and the article identification information corresponding to the time and position information is specified; in steps S13 and thereafter, processes analogous to those in the above description are executed.

For example, during five to ten seconds from the start of a certain moving image, information on correspondence relationship indicating that a right person holds the article A and a left person holds the article B is preliminarily received and stored. When the purchaser views the moving image and chooses the article held by the left person at the time point at eight seconds, the relative time of eight seconds and the position information that it is on the left side in the frame are received, and the article B is specified.

Improvement in shopping usability according to the present invention causes a possibility of sequential purchase of articles with low necessity due to temporal wants. In particular, in a case of television broadcast, even elder people with a low recognition function can easily purchase articles, and may repeat purchase without sufficient confirmation owing to the real-time feature. It is thus preferable that a combined use of a configuration of allowing only a specific purchaser to purchase an article through a password or a camera added to a television, a configuration of requiring an approval operation by a family or a helper, a configuration of allowing cancellation with a predetermined time being secured until an order confirmation, a configuration of providing a frame of a budget amount or the number of purchases and of not accepting purchase exceeding the frame, a configuration of enabling information pertaining to the article obtained by the present invention to be added to "Wish List" to allow scrutiny of necessity of the article and an order at a later date.

Example 32

[H Economy Adjusting Prices]

The fact that development of the information communication technology causes a wide range of competition of selling articles, which is a cause of deflation and reduction in salary, is as described in "Technical Problem".

Reduction in opportunity of price competition according to the present invention increases the prices. There is a concern that inflation, which is undesirable for purchasers, is caused. On the other hand, there is also a possibility that enhancement of the price competition due to the present invention causes reduction in prices, which is undesirable for sellers. There is thus an object to adjust the prices of articles traded using the present invention.

Here, in the trade information exchange method, the number of sellers selected in the first selection step is referred to as "first number of selected sellers", and the number of sellers selected in the second selection step is referred to as "second number of selected sellers".

If the second number of selected sellers is large, many sellers are permitted to communicate. The number of estimates presented to the purchaser is also increased accordingly. The seller thinks "to win the price competition against many sellers, the estimate amount is required to be reduced". It is estimated that the purchase amount by the purchaser is reduced accordingly. If this process continues, the prices are totally reduced. If the second number of selected sellers is small, the price is increased in an inverted manner. With respect to each field such as "concrete product" and each area, the prices of certain specific articles are investigated, thereby allowing the tendency of the prices of articles to be grasped for each article field and area.

Thus, according to a method of operation where upon observation of increase in prices, the second number of selected sellers is increased in order to reduce the prices, and upon observation of reduction in prices, the second number of selected sellers is reduced in order to increase the prices, an advantageous effect of keeping the prices within a certain range can be expected. Preferably, adjustment may be made according to each field of articles and each area.

In trade information exchange one time a day, the number of selected sellers is required to be an integer value. The number of selected sellers is statistically adjusted so as to be a non-integer decimal value, thereby allowing more precise adjustment. In a case of allowing the second number of selected sellers to be selected by the purchaser, change of the range of selection through the method described above is effective.

Tendering for the second selection by the seller is overheated causes a problem in that payment of the bid becomes a burden for the seller.

The first selection chooses the sellers matching the reception condition. Furthermore, the first number of selected sellers can be reduced by means for a random number or for giving a priority to local sellers. It is estimated that if the first number of selected sellers is large, the seller tends to think that he or she is required to present a higher bid, and if the first number of selected sellers is small, he or she tends to think that the bid is not necessarily too high. Consequently, the first number of selected sellers affects the competition rate at a stage of tendering, and the magnitude of payment. In a case where tendering prone to be overheated, the burden of tendering on the seller can be reduced by the operator of the trade information exchange device reducing the first number of selected sellers.

The trade information exchange method according to the present invention is referred to as H marketing. A market including "sea of demand" is referred to as H market. The economic system of the present invention is referred to as H economy.

Operation on the interest rate and monetary supply generally performed by the central bank in order to adjust the prices in the market economy is indirect price adjustment means. Consequently, the operation has a risk of causing excessive overheating of the economy (bubble) and inflation. Furthermore, price adjustment does not work and deflation cannot be stopped in some cases.

In the H economy that is a market economy but the range of competition can be adjusted, the price adjustment works directly, and immediate advantageous effect can be expected. Furthermore, it can be expected that speculative money games are difficult to occur.

As with the central bank, price adjustment should be independent of politics, and be carefully performed by an organization in which opinions of both the purchasers and sellers are reflected. It is important that the trade information exchange device SV1 is a safe and robust information system.

Example 33

[Customer Attending Service in Parallel]

The seller permitted to communicate provides consultation for the purchaser and submits the estimate. Here, this is referred to as customer attending service. For the sellers, customer attending services require labor costs. There is a problem in that the selling prices becomes high in comparison with those of shops dedicated for home shopping on the network without customer attending services in person. There is thus an object to achieve competitive selling prices by reducing the customer attending service cost.

As means for achieving the object, a technique is described that sellers permitted to communicate can achieve proposals and negotiations by providing customer attending services for multiple customers at the same time through means, such as email or chatting. For example, it can be considered that an accustomed seller can provide customer attending services for five to ten customers at the same time through email and chatting.

The number of customers a certain seller provide services at the same time is referred to as "the number of customers to be served". The number of purchasers that can be accepted to be served is referred to as "the number of acceptable customers to be served". This corresponds to "vacancy". In this Description, the seller indicates a person or an organization, such as a shop or a company. In some cases, multiple (P) customer attendants are arranged in one seller. In such cases, provided that one customer attendant provides customer attending services in parallel for multiple (Q) purchasers, the number of customer attending services is P×Q at the maximum. One seller is represented as a queueing model M/M/(P×Q).

Acceptance of a purchaser even with the number of acceptable customer attending services having no vacancy increases the waiting time for chatting, which makes the purchaser feel unsatisfactory. The purchaser is kept waiting in a stage before the customer attending service any way. On the other hand, other seller has the number of customer attending services with vacancy. It is thus required to assign purchasers in a range without exceeding the number of customer attending services which the seller can provide.

Simply speaking, provided that the seller does not bid for the second selection if the number of acceptable customer attending services indicates no vacancy, the problem described above is considered not to occur. However, there is an important drawback that if there is many sellers that do not bit, a situation occurs where the number of sellers to bid does not satisfy the second number of selected sellers.

It is assumed that a hierarchical queuing mechanism in which such sellers reside is adopted in the entire system of the H-market, and the purchaser is assigned in consideration of the degree of vacancy of the number of customer attending services. More specifically, a configuration is adopted that adds a condition of regarding, as a target of selection, limited sellers with (vacancy) the number of acceptable customer attending services being one or more in addition to the choosing condition, such as a request, in the first selection.

In a case where in permission of communication after the second selection, communication is further permitted also to the seller that have already obtained the permission and is providing the customer attending service, customer attending service in parallel can be achieved.

As to the advantageous effect, the cost of the customer attending service per purchaser can be significantly (1/Q times) reduced in comparison with the case without customer attending services in parallel and the case where a clerk provides a customer attending service in person on an one-on-one basis. Furthermore, a case is eliminated where the purchaser is kept waiting because the number of purchasers assigned to a certain seller exceeds the capacity of customer attending services. A case is also eliminated where even though the number of customer attending services of a certain seller indicates vacancy, the purchaser is kept waiting at another seller. (This is inapplicable to occurrence of waiting time in a case where all the sellers cannot afford the customer attending services because the number of purchasers is too large.)

As a method of calculating the number of customer attending services which the seller can provide in the first selection, a method of issuing notification on the number of customer attending services which the seller can provide for the server SV1 at any time and storing the number, a method of preliminarily registering the maximum number of customer attending services which the seller can provide for the server SV1 and calculating the number of usable customer attending services on the basis of the number of permission of communication made by the server SV1 and the like can be considered. Alternatively, the number of customer attending services at the end of tendering may be estimated on the basis of an average customer attending service time.

REFERENCE SIGNS LIST

1 Data processing unit; 3,21,31,41 Storing unit; 5 Charging unit; 7,51 settlement unit; 8 Shopping cart; 9 Reward unit; 22 Advertisement information processing unit; 32 Tendering processing unit; 52 Purchase processing unit; SV1 Trade information exchange device; SV2 Advertisement information processing device; SV3 Tendering device; SV4 Shopping processing device; C1 seller's computer; C2 purchaser's computer; C3 Computer of additional service provider; C4 affiliate's computer; C5 shopping device; C6 Robot; C7 Vehicle

The invention claimed is:

1. An information exchange device that is connected to multiple computers connected to an information communication network for achieving information exchange between one or more computers used by one or more first users who wish to communicate with second users and one or more computers used by one or more second users who send request conditions, comprising:

processing means; and memory means having stored thereon computer-executable instructions that are structured such that, when executed by the processing means, causes the information exchange device to:

receive reception conditions from the one or more computers used by the one or more first users via the information communication network;

cause the memory means to store the first users' reception conditions;

receive a transmission of marked data from one of the computers used by one of the second users via the information communication network, wherein the marked data is generated by applying annotations to one or more recognized keywords within an information input;

extract, from the marked data based on the applied annotations, the one or more keywords as one or more request conditions;
cause the memory means to store the request conditions;
perform a first selection that chooses first users whose reception conditions conform to the one or more request conditions as first selected first users, from among one or more of the first users;
transmit the received request conditions without contact information of the second user to the computers used by the first selected first users;
for each of the first selected first users, receive information indicating a bid for an opportunity to communicate with the second user from the computer used by a corresponding first selected first user;
select a subset of first users from the first selected first users, as second selected first users, based on the bids received from the first selected first users; and
cause communication between the computers used by at least one of the second selected first users and the computer that is an originator of the request conditions.

* * * * *